US012284472B2

(12) United States Patent
Papadopoulos et al.

(10) Patent No.: US 12,284,472 B2
(45) Date of Patent: Apr. 22, 2025

(54) WEARABLE MICROPHONE TRANSMITTER FOR USE WITH A PLURALITY OF HEADPHONES

(71) Applicant: HEADPHONE EVENTS, INC., Boston, MA (US)

(72) Inventors: Costas Papadopoulos, Acton, MA (US); Joseph Genovese, Lincoln, MA (US); Nadim El-Fata, Winchester, MA (US)

(73) Assignee: Headphone Events, Inc., Boston, MA (US)

( * ) Notice: Subject to any disclaimer, the term of this patent is extended or adjusted under 35 U.S.C. 154(b) by 340 days.

(21) Appl. No.: 17/992,017

(22) Filed: Nov. 22, 2022

(65) Prior Publication Data

US 2023/0164469 A1 May 25, 2023

Related U.S. Application Data

(60) Provisional application No. 63/282,206, filed on Nov. 23, 2021.

(51) Int. Cl.

| | |
|---|---|
| ***H04R 25/00*** | (2006.01) |
| ***H04R 1/04*** | (2006.01) |
| ***H04R 1/10*** | (2006.01) |
| ***H04R 1/32*** | (2006.01) |
| *H04R 3/00* | (2006.01) |

(52) U.S. Cl.

CPC ............. *H04R 1/04* (2013.01); *H04R 1/1083* (2013.01); *H04R 1/326* (2013.01); *H04R 3/00* (2013.01); *H04R 2201/109* (2013.01)

(58) Field of Classification Search

CPC ........ H04R 1/04; H04R 1/1083; H04R 1/326; H04R 2201/109; H04R 3/00; H04R 1/08; H04R 2420/07; H04R 27/00

USPC .......................................................... 381/190

See application file for complete search history.

(56) References Cited

U.S. PATENT DOCUMENTS

| | | | |
|---|---|---|---|
| 5,978,491 | A | 11/1999 | Papadopoulos |
| 6,266,424 | B1 | 7/2001 | Papadopoulos |
| 6,504,937 | B1 | 1/2003 | Papadopoulos |
| 6,580,797 | B1 | 6/2003 | Papadopoulos |

OTHER PUBLICATIONS

Electret Condenser Microphone EM247, Primo Co., Ltd. Technical Data sheet, Oct. 2020, 1pg.

*Primary Examiner* — Phylesha Dabney

(74) *Attorney, Agent, or Firm* — Gesmer Updegrove LLP

(57) ABSTRACT

A microphone transmitter has a microcontroller that operates in a high gain mode when the portable housing is in a horizontal position or in a low gain mode when the portable housing is in a vertical position. In another implementation, the microcontroller operates in one of the following modes: (1) operate the microphone at a low microphone gain when the portable housing is in a vertical position and when voice activity is detected; (2) operate the microphone at a lower microphone gain when the portable housing is in a vertical position and when no voice activity is detected; (3) operate the microphone at a high microphone gain when the portable housing is in a horizontal position and when no voice activity is detected; or (4) operate the microphone at a higher microphone gain when the portable housing is in a horizontal position and when voice activity is detected.

35 Claims, 38 Drawing Sheets

DECT MIC TRANSMITTER PAGE 5 OF 6: THIS PAGE CAPTURES A FIRST EMBODIMENT WHERE MIC OUTPUT IS SWITCHED BETWEEN TWO LEVELS, A SECOND EMBODIMENT WILL SELF ADJUST TO MANY LEVELS

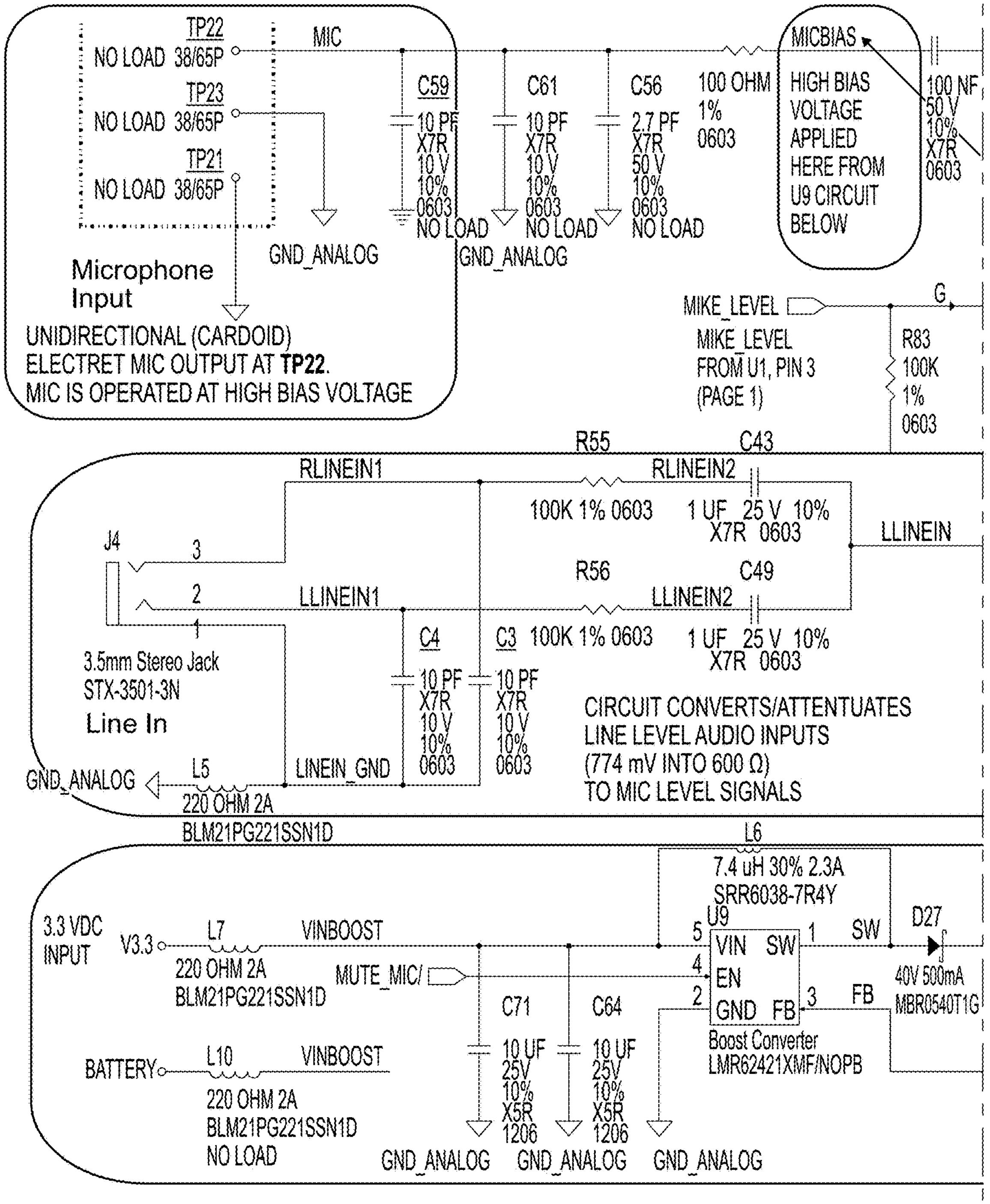

PREFERRED UNIDIRECTIONAL MIC IN FIRST EMBODIMENT SHOWN CONNECTED AT TP 22 IS CUI INC. PART NUMBER CMC-97452-L100

SUITABLE OMNIDIRECTIONAL MIC FOR SECOND EMBODIMENT MAY INSTEAD BE CONNECTED AT TP22, SUCH AS DB UNLIMITED, LLC PART NUMBER MO093803-2

FIG. 13

DECT MIC TRANSMITTER PAGE 6 OF 6

VERTICAL CROSS SECTION
WHERE MIC CUSHION
TOTALLY ENCLOSES MIC

WEARABLE MICROPHONE TRANSMITTER FOR USE WITH A PLURALITY OF HEADPHONES

RELATED APPLICATION

This application claims the benefit of provisional application 63/282,206 filed Nov. 23, 2021.

BACKGROUND OF THE INVENTION

Field of Invention

The present invention relates generally to the field of microphones and headphones. More specifically, the present invention is related to a wearable microphone transmitter for use with a plurality of headphones.

Background

Embodiments of the present invention are an improvement over prior art systems and methods.

SUMMARY OF THE INVENTION

In one embodiment, the present invention provides a microphone transmitter comprising: (a) a portable housing; (b) a microcontroller; (c) a microphone receiving sound arriving via a first port and a second port located in the portable housing and generating a microphone input signal, the microcontroller providing a noise-control signal based on whether noise or speech is arriving at the microphone ports, and generating a noise-attenuated signal output in the absence of speech; (d) a transmitter circuit operable for transmitting the noise-attenuated signal; (e) an accelerometer circuit configured to generate an orientation signal based on a sensed orientation of the portable housing, (f) a power source configured to power the microcontroller, the microphone, the transmitter circuit, and the accelerometer circuit, wherein the power source, the microcontroller, the microphone, the transmitter circuit, the accelerometer circuit are located within the portable housing, and wherein the microcontroller receives the orientation signal and operates in a high gain mode when the portable housing is in a horizontal position or in a low gain mode when the portable housing is in a vertical position.

In another embodiment, the present invention provides a microphone transmitter comprising: (a) a portable housing; (b) a microcontroller; (c) a microphone receiving sound arriving via a first port and a second port located in the portable housing and generating a microphone input signal, the microcontroller providing a noise-control signal based on whether noise or speech is arriving at the microphone ports, and generating a noise-attenuated signal output in the absence of speech; (e) a high-voltage bias circuit comprising a voltage step-up circuit configured to generate a high microphone output level signal from the noise-attenuated signal; (f) an accelerometer circuit configured to generate an orientation signal based on a sensed orientation of the portable housing; (g) a microphone level adjustment circuit receiving the high microphone output level signal, the microphone level adjustment circuit comprising one or more field-effect transistors (FETs), the microphone level adjustment circuit, upon receiving instructions from the microcontroller, configured to operate either in a high gain mode when the portable housing is in a horizontal position or in a low gain mode when the portable housing is in a vertical position, wherein the FETs are turned off to increase a microphone level when the portable housing is in the horizontal position and the FETs are turned on to decrease the microphone level when the portable housing is in the vertical position; (h) a transmitter circuit operable for transmitting output of the microphone level adjustment circuit; (i) a power source configured to power the microcontroller, the microphone, the high-voltage bias circuit, the accelerometer circuit, the microphone level adjustment circuit, and the transmitter circuit; wherein the power source, the microcontroller, the microphone, the high-voltage bias circuit, the accelerometer circuit, the microphone level adjustment circuit, and the transmitter circuit are located within the portable housing.

In yet another embodiment, the present invention provides a microphone transmitter comprising: (a) a portable housing; (b) a microcontroller; (c) a microphone receiving sound arriving via a first port and a second port located in the portable housing and generating a microphone input signal, the microcontroller providing a noise-control signal based on whether noise or speech is arriving at the microphone ports, and generating a noise-attenuated signal output in the absence of speech; (d) an accelerometer circuit configured to generate an orientation signal based on a sensed orientation of the portable housing; (e) a voice activity detector circuit detecting when the microphone output contains voice activity and when the microphone output contains no voice activity; (f) a transmitter circuit operable for transmitting output of the microphone level adjustment circuit; (g) a power source configured to power the microcontroller, the microphone, the accelerometer circuit, and the transmitter circuit; wherein the power source, the microcontroller, the microphone, the high-voltage bias circuit, the accelerometer circuit, the voice activity detector circuit, the microphone level adjustment circuit, and the transmitter circuit are located within the portable housing; and the microcontroller receiving the orientation signal and operating the microphone in one of the following modes: (1) operate the microphone at a first low microphone gain, G1, when the portable housing is in a vertical position and when voice activity is detected by the voice activity detector circuit; (2) operate the microphone at a second lower microphone gain, G2, when the portable housing is in a vertical position and when no voice activity is detected by the voice activity detector circuit, where G2<G1; (3) operate the microphone at a first high microphone gain, G3, when the portable housing is in a horizontal position and when no voice activity is detected by the voice activity detector circuit; or (4) operate the microphone at a second higher microphone gain, G4, when the portable housing is in a horizontal position and when voice activity is detected by the voice activity detector circuit, where G3<G4.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1A:
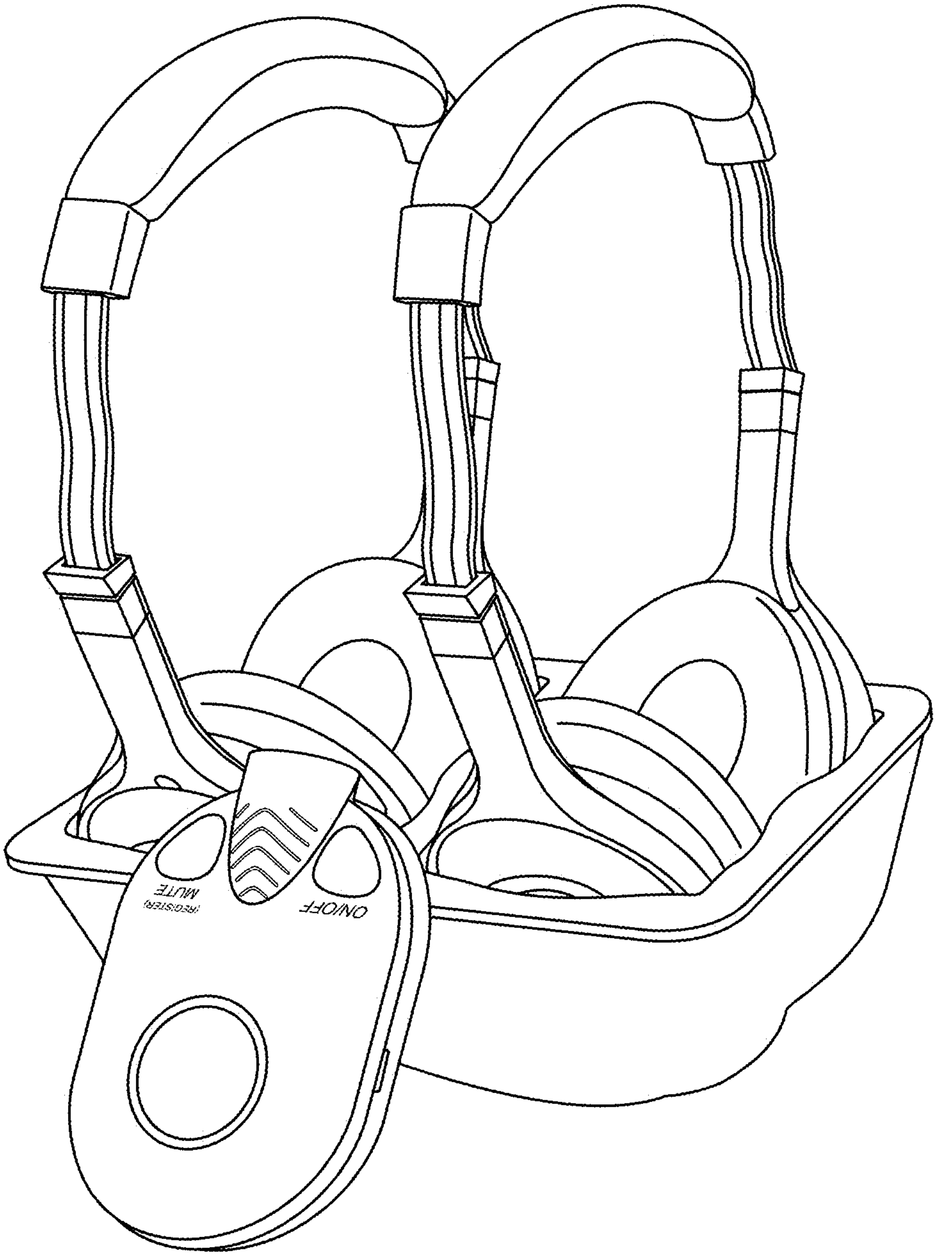
FIG. 1A depicts a charging station that provides built-in charging for the headphone and transmitter of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention is a small, portable DECT transmitter with built-in microphone and can be used with the present invention's headphones.

In one usage scenario it is a wearable microphone, to be worn with a lanyard around the neck for hands-free and cord-free movement by a presenter; this is the pendant microphone mode.

In a second scenario, the microphone is positioned on a table, so that a small group of participants sitting and listening with the present invention's headphones can all speak and be heard; this is the conference microphone mode.

An accelerometer circuit directs the microcontroller to select the preferred sound output level for each scenario, by sensing orientation.

Horizontal position enables the conference microphone mode with higher "gain" because the microphone is at some distance from each speaking participant.

Vertical position activates the pendant mode with lower "gain" because the microphone is hanging from the neck therefore near the presenter's mouth.

The microphone has a directional pattern that favors sound arriving at the front end of the housing and attenuates noise from the back.

The underside of the housing is covered by a resilient non-skid pad to isolate the microphone from table bumps and room vibration.

The product is rechargeable and engages magnetically with charging cups in the same manner as any of the accompanying headphones.

The lanyard is magnetically secured so it has a breakaway feature to disengage safely from the housing if pulled abruptly.

The accelerometer circuit can additionally trigger rapid muting when it senses shock or free fall, so that the headphone user is not startled by loud unwanted sounds as the microphone transmitter is struck.

In a second embodiment, a digitally controlled potentiometer provides additional levels of gain adjustment such that in the absence of voice signals, ambient room noise will not be audible at the headphone.

FIG. 1A depicts a charging station that provides built-in charging for the headphone and transmitter described above. It should be noted that a single transmitter may be associated with a plurality of headphones as shown in FIG. 1A, but the particular number of headphones linked with a single transmitter should not be used to limit the scope of the present invention. The headphones attract magnetically to charging cups in the base, and an AC adapter connects the charging station to a wall outlet to provide built-in charging for the headphones.

Figure 1C:
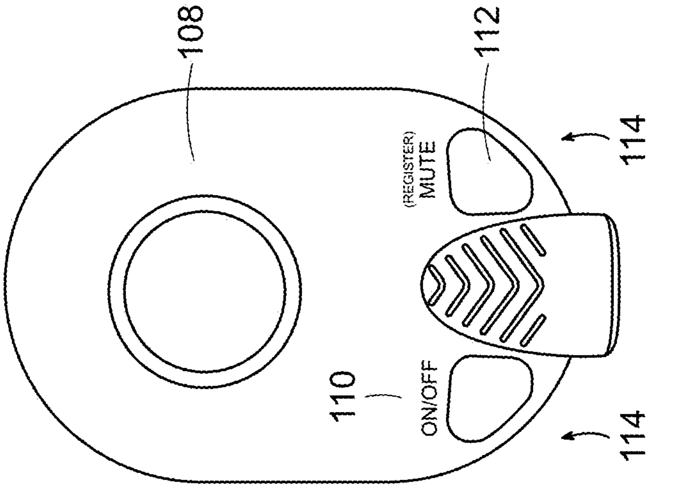
FIG. 1C illustrates a top view of the microphone transmitter of the present invention.
Figure 1B:
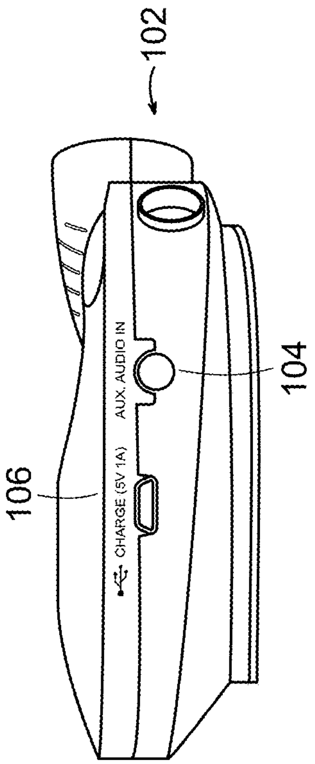
FIG. 1B illustrates a side view of the microphone transmitter of the present invention.

FIG. 1B depicts a side view of the microphone transmitter housing microphone 102. The transmitter may be configured to connect to any audio source (e.g., via the shown "AUX AUDIO IN" port 104) and is powered by a rechargeable battery (that may be rechargeable via, for example, a micro-USB® port 106) that enables portability and provides up to, for example, 3 hours of audio transmission per charge.

FIG. 1C depicts a top view of the compact, portable, and battery-powered microphone transmitter 108. The microphone transmitter may be powered on via the "on/off" switch 110 and the "(Register) MUTE" button 112 may be used to mute the microphone and in the registration process. Lanyard-mating magnets 114 are provided on either side of the microphone transmitter as contact points for the ends of the lanyard that allow for easy attachment.

Figure 1D:
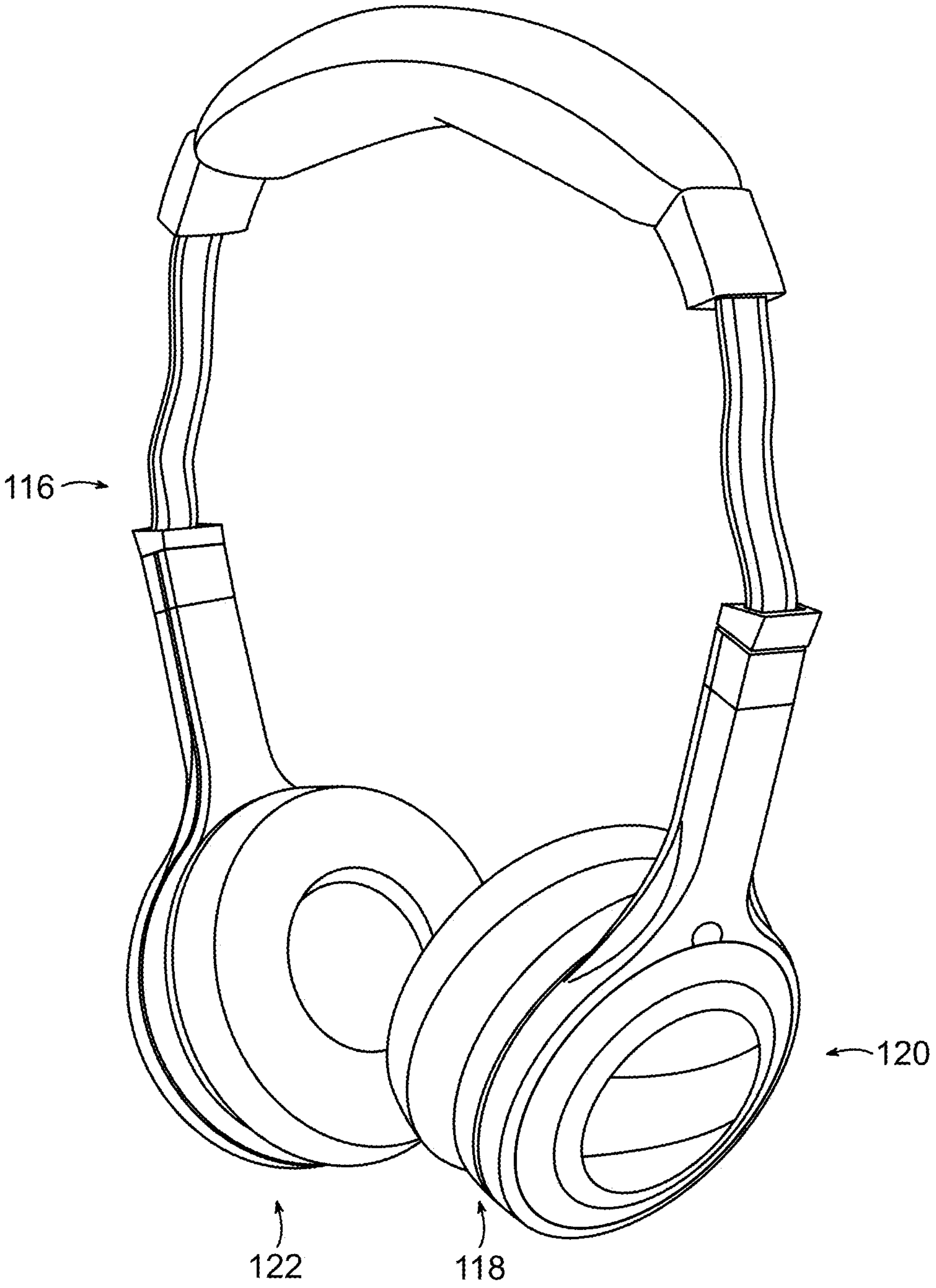
FIG. 1D depicts an example of a headphone that may be used as part of the present invention.
Figure 1E:
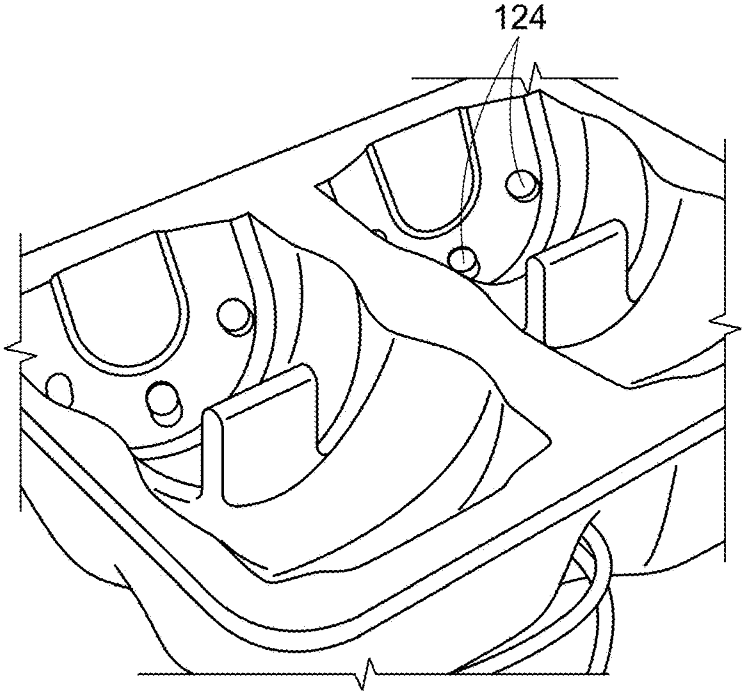
FIG. 1E depicts a charging station for charging the headphones and transmitter.
Figure 1F:
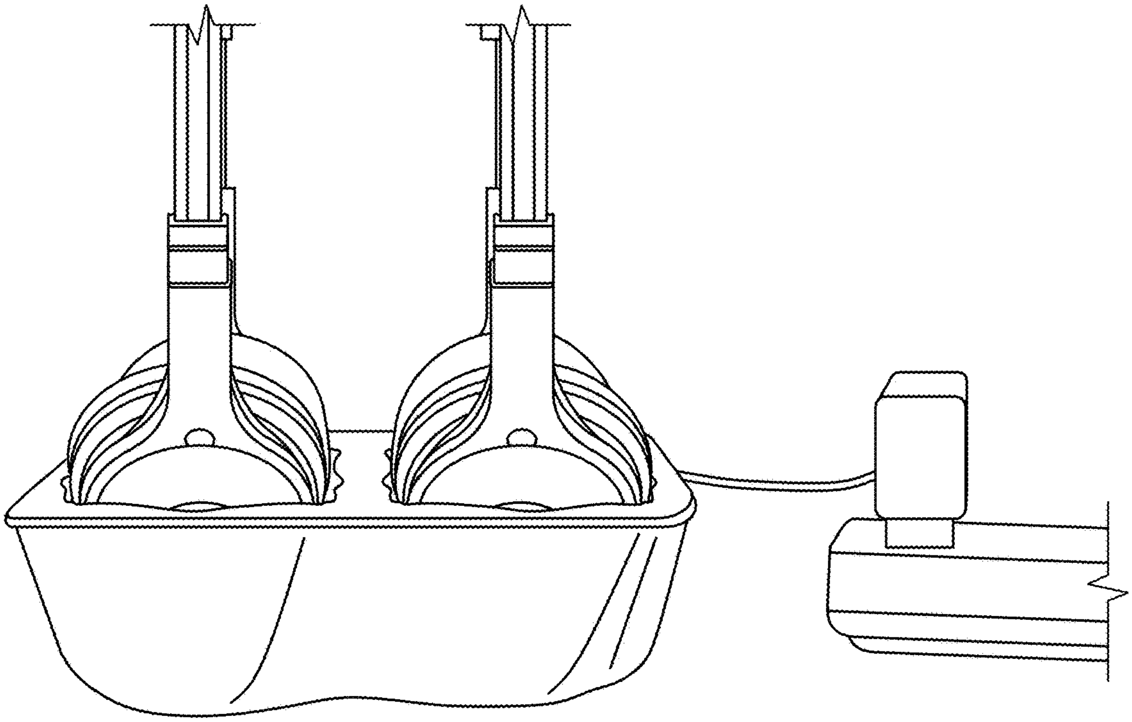
FIG. 1F depicts the headphones that are placed in the charging cup with the volume buttons facing the side of the cup without magnets.

FIG. 1D depicts an example of a headphone that may be used as part of the present invention. The headphones have an adjustable headband 116 and have hearing-aid-friendly ear cups 118. The headphone has a power-on button along with volume control buttons (collectively labeled 120). The headphone also has charging contacts 122 for charging the headphone. FIG. 1E depicts a charging station for charging the headphones, where the charging station has a set of magnets 124. The charging station may be connected via an AC adapter to a power outlet. The headphones are placed in the charging cups with the volume buttons facing the side of the cup without magnets as shown in FIG. 1F. The headphones will attract to the charging cups magnetically (where a "click!" may be heard), and the charging LED will briefly blink red and orange. The headphones will show red on the side without the volume buttons while they are charging, and the microphone transmitter will show red on the ON/OFF button. They will both turn green when they are fully charged. T-Coil equipped hearing aids may also be used by inserting the neck loop plug into the 3.5 mm port on the bottom of the headphone on the side with the volume buttons, where the neck loop may then be positioned around the neck.

Figure 1G:
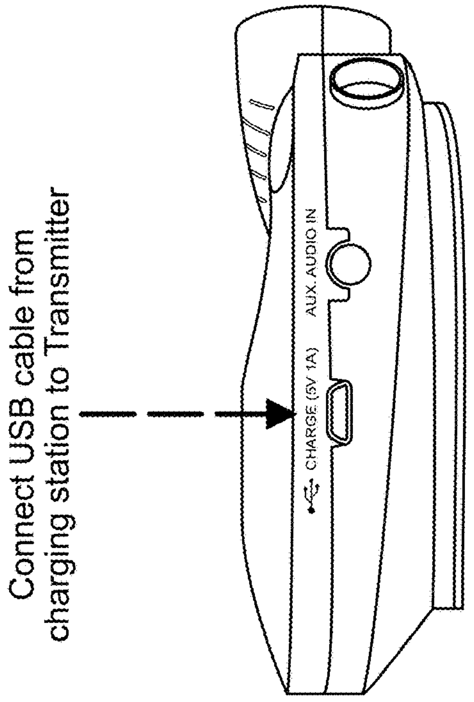
FIGS. 1G-H depict the USB process of charging the microphone transmitter.
Figure 1H:
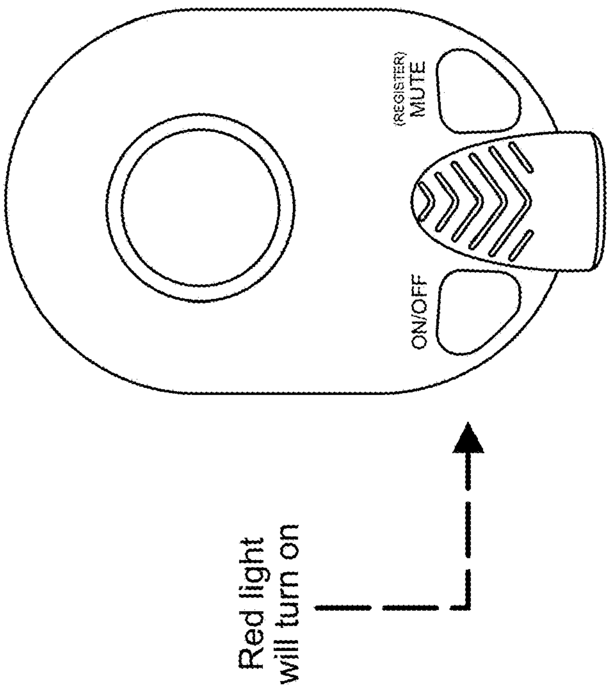

FIGS. 1G-H depict the process of charging the microphone transmitter. In one non-limiting example, a short micro-USB cable may be connected from a charging station to the charging port on the microphone transmitter. The red indicator light will appear on the ON/OFF button when the microphone transmitter is charging. The indicator light will turn green when the transmitter is fully charged. Any charging source with Micro-USB cable may also be used.

Figure 1I:
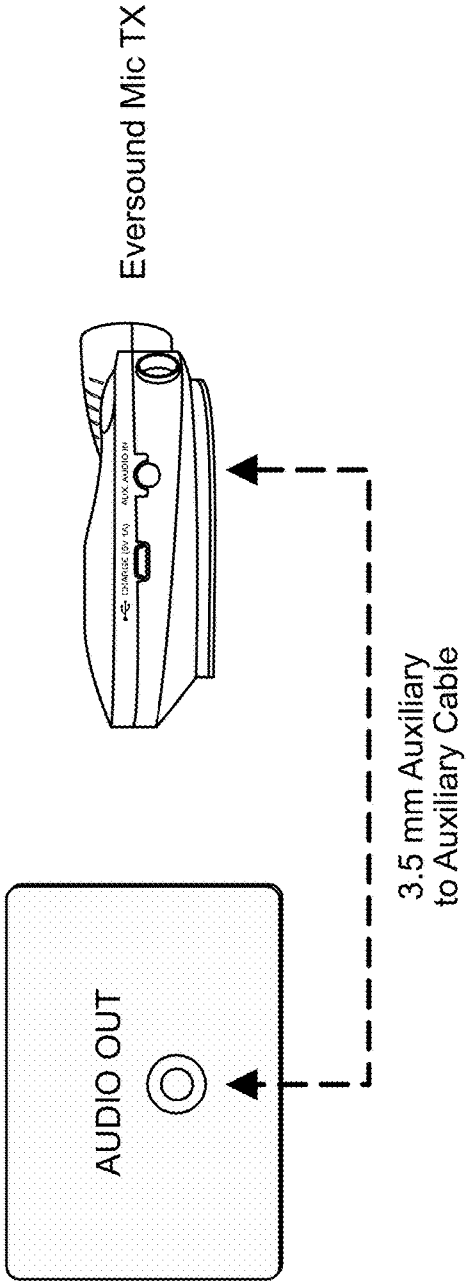
FIGS. 1I-J depict connecting the microphone transmitter to an audio source.
Figure 1J:
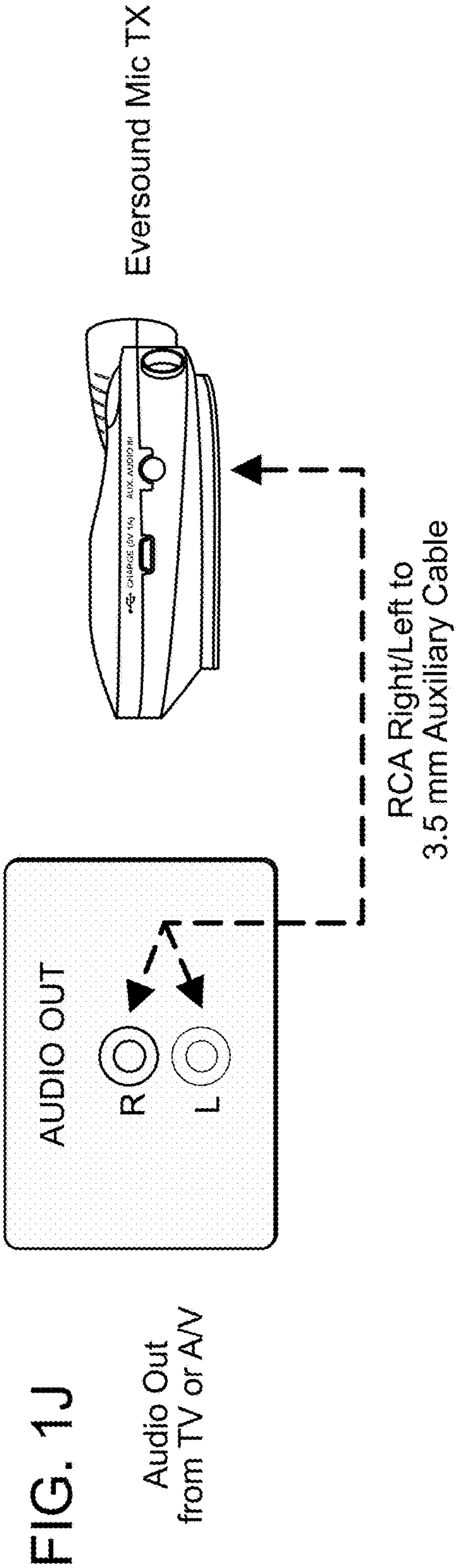

FIGS. 1I-J depict connecting the microphone transmitter to an audio source. The microphone transmitter may be connected to any audio source including smartphones, tablets, computers, televisions, DVD players, A/V systems, radio, and more. A smartphone, tablet, iPod™, iPad™, music player, radio, etc. may be connected via an auxiliary cable" (e.g., 3.5 mm auxiliary cable) to connect the "Audio Out" or "Headphones Out" port on the music player to the "AUX. AUDIO IN" port on the side of the microphone transmitter (see FIG. 1I). A similar approach may be used to connect a television to the microphone transmitter where an auxiliary cable may be used to the audio output of the television to the audio input of the microphone transmitter. FIG. 1J depicts another option where a right and left channel of an audio source (e.g., a television) may be connected to the microphone transmitter via another auxiliary cable.

Figure 1K:
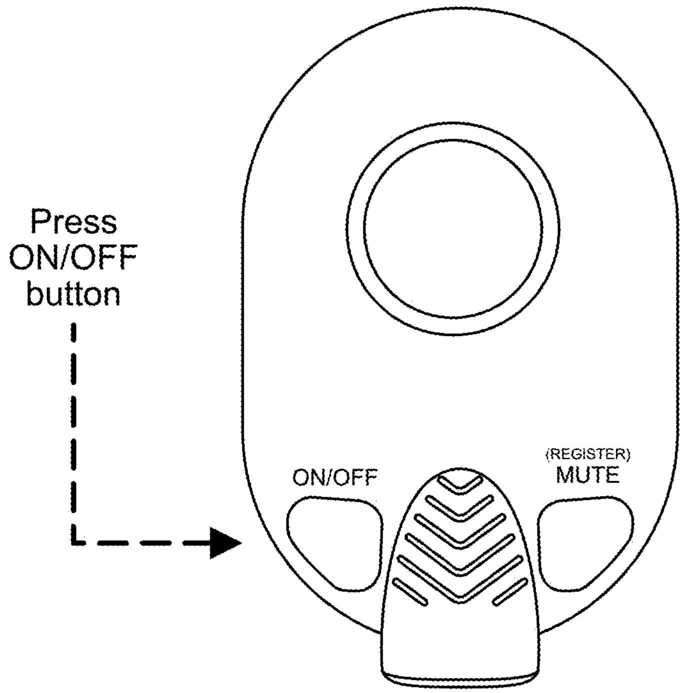
FIG. 1K depicts the methodology associated with powering on (or powering off) the microphone transmitter.

FIG. 1K depicts the methodology associated with powering on (or powering off) the microphone transmitter. To power on the microphone transmitter, the ON/OFF button is depressed. The "(REGISTER) MUTE" button will flash blue, then turn solid blue after the first headphone is powered on.

Figure 1L:
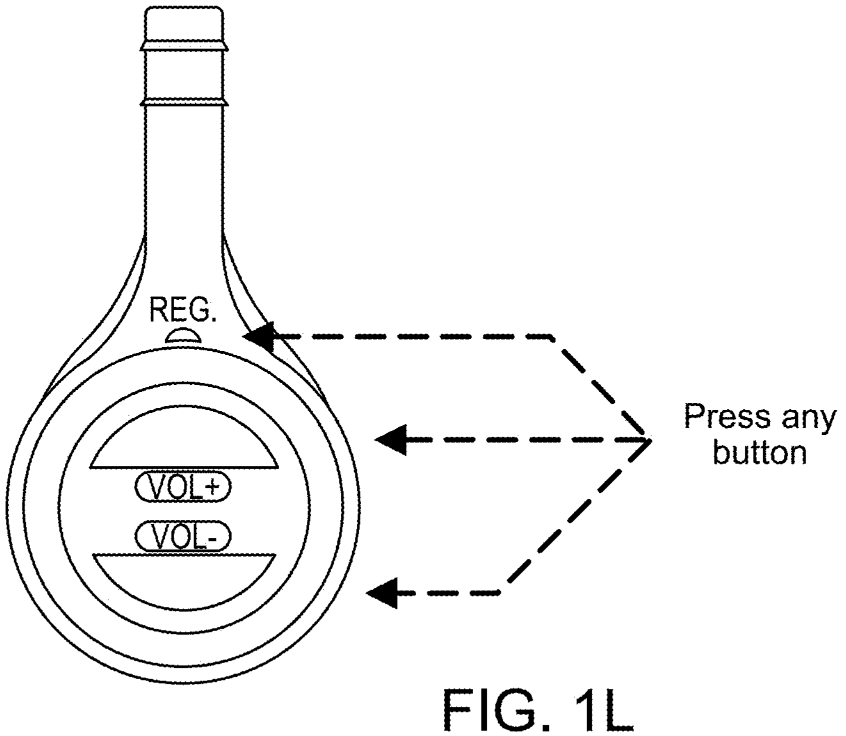
FIG. 1L depicts the methodology associated with powering on (or powering off) the headphones.

FIG. 1L depicts the methodology associated with powering on (or powering off) the headphones. Once the microphone transmitter is powered on, any of the three buttons on the headphones may be depressed to power them on. Indicator lights on the headphones will flash for a short duration and then turn solid blue once they've connected to the transmitter. This process is repeated for additional headphones that are intended to be used with the same microphone transmitter. When the microphone transmitter is powered down, the headphones may also automatically power down after a short delay. The headphones will also power down if inserted into the charging stations. The headphones may also be powered down by the user (e.g., by pressing and holding both the up and down volume buttons simultaneously).

Figure 2A:
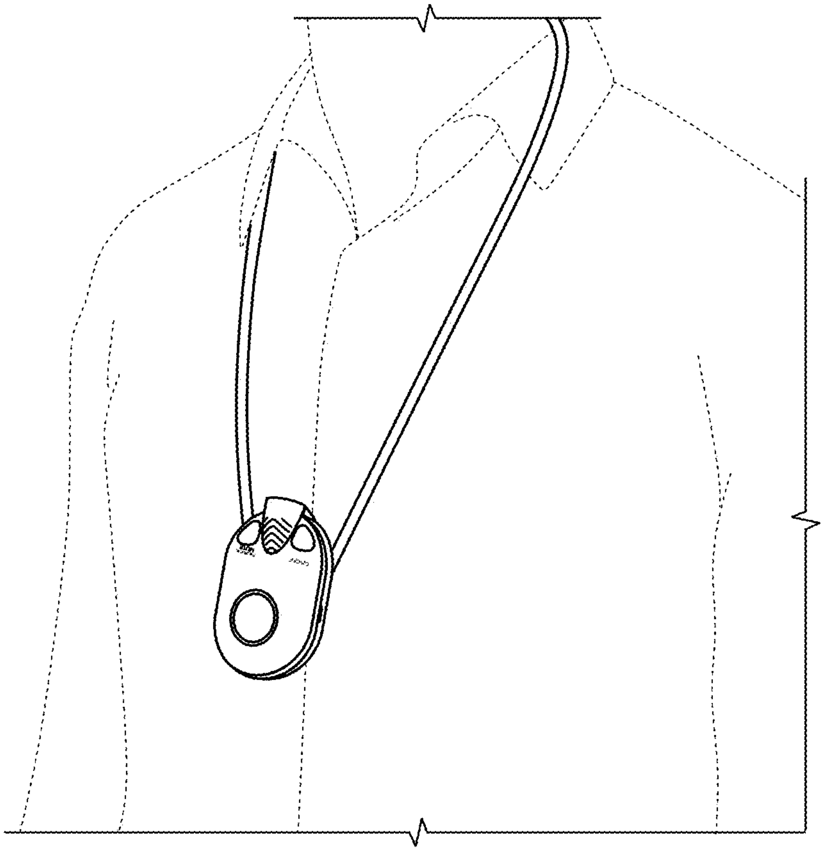
FIG. 2A depicts a "Personal Mode" of use of the microphone transmitter, where the microphone transmitter is hung vertically with a lanyard around the neck. In this mode, the microphone transmitter is more effective for a single speaker.
Figure 2B:
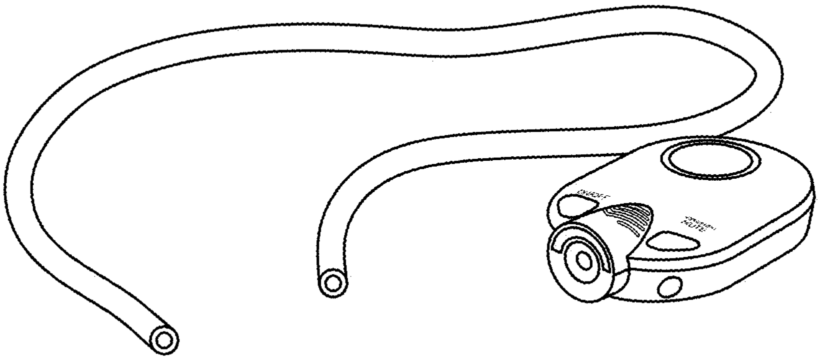
FIG. 2B depicts the microphone transmitter that is separated from the lanyard.

FIG. 2A depicts a "Personal Mode" of use of the microphone transmitter, where the microphone transmitter is hung vertically with a lanyard around the neck. In this mode, the microphone transmitter is more effective for a single speaker. To attach the lanyard, the magnetic ends of the lanyard are placed proximate to the two metal circles on the front of the microphone transmitter. They will click into place. The lanyard may be removed by gently tugging the microphone transmitter. FIG. 2B depicts the microphone transmitter that is separated in such a fashion.

Figure 3:
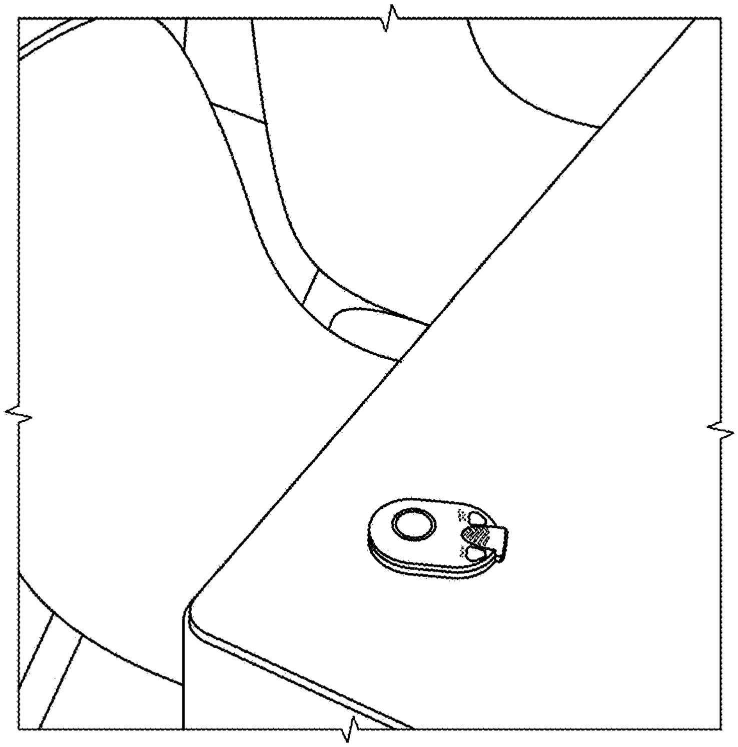
FIG. 3 depicts a "Conference Mode" of use of the microphone transmitter that is placed horizontally.

FIG. 3 depicts a "Conference Mode" of use of the microphone transmitter that is placed horizontally. In this mode, the microphone transmitter will have a broader area of effect for picking up audio to the front and sides for a group discussion. It is best to remove the lanyard in this mode to reduce the noise caused by its movement.

For ease of use, each set (of headphones and their associated microphone transmitter) is labeled with colored stickers to signify which microphone transmitter sends a signal to which headphones. This can be used to identify which headphones go with each microphone transmitter for a variety of uses.

Figure 4:
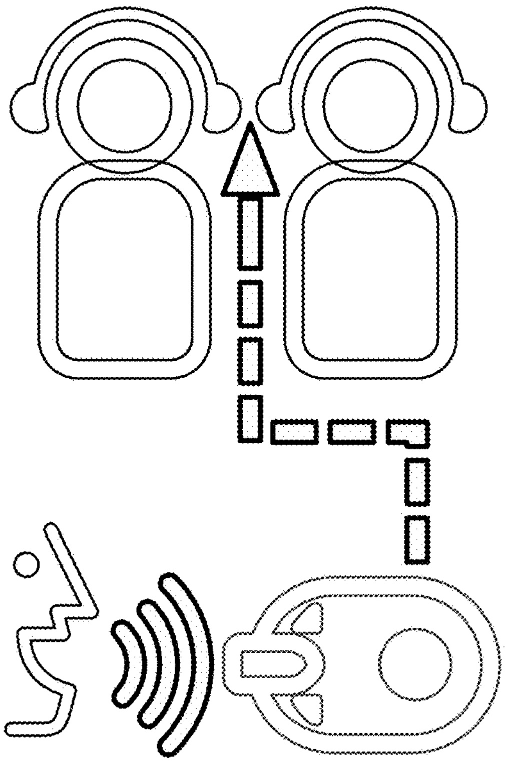
FIG. 4 depicts a 1:1 or 1:2 Conversational Mode that is used for non-distanced personal visits, caregiver sessions, and small prospect tours.

FIG. 4 depicts a 1:1 or 1:2 Conversational Mode that is used for non-distanced personal visits, caregiver sessions, and small prospect tours. In this scenario, either of the two sets of two headphones and one microphone transmitter with matching colors may be used. Two pairs of headphones can be used independently of each other at the same time.

Figure 5:
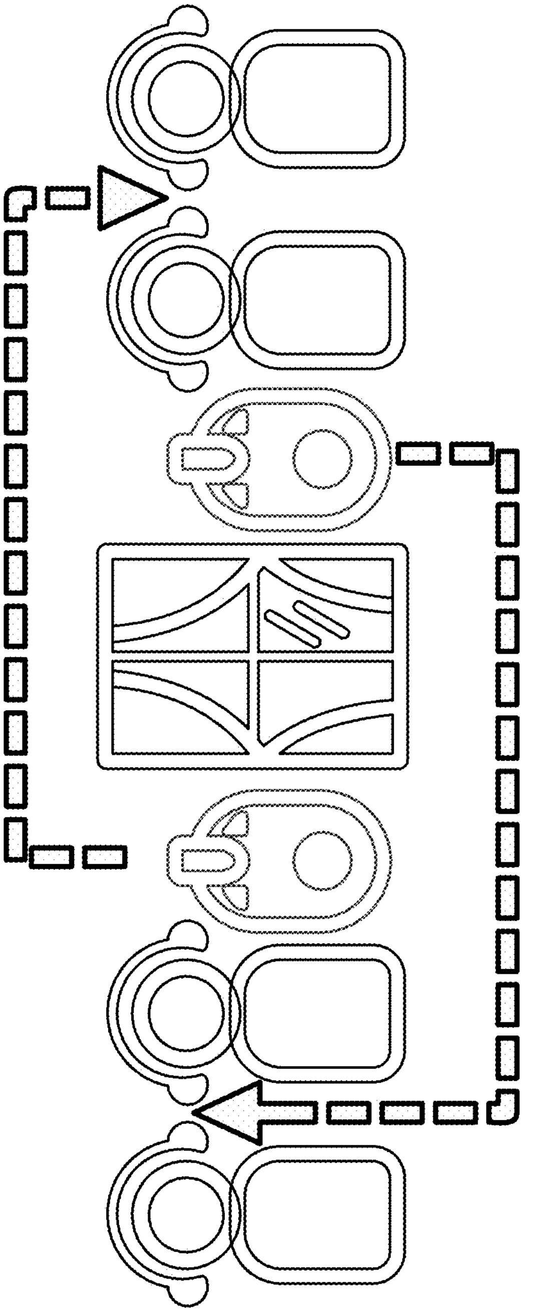
FIG. 5 depicts a Distanced Visitation Mode that is used for two individuals or groups that are physically distant or separated by a window or other partition to communicate clearly across separation.

FIG. 5 depicts a Distanced Visitation Mode that is used for two individuals or groups that are physically distant or separated by a window or other partition to communicate clearly across separation. Arrange headphones on either side of the partition so each side has a set of different color headphone and transmitter.

Figure 6:
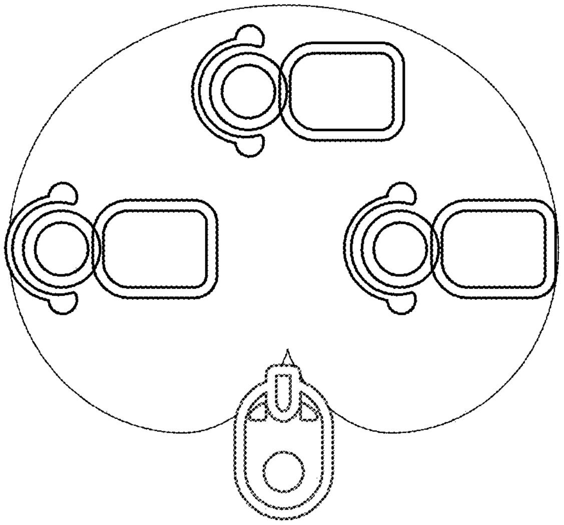
FIG. 6 depicts a Small Group Mode that is used for a group (e.g., using up to 3-4 headphones) and one microphone.

FIG. 6 depicts a Small Group Mode that is used for a group (e.g., using up to 3-4 headphones) and one microphone. Small group discussions require the re-registration of one to two of all headphones to the one transmitter.

Figure 7:
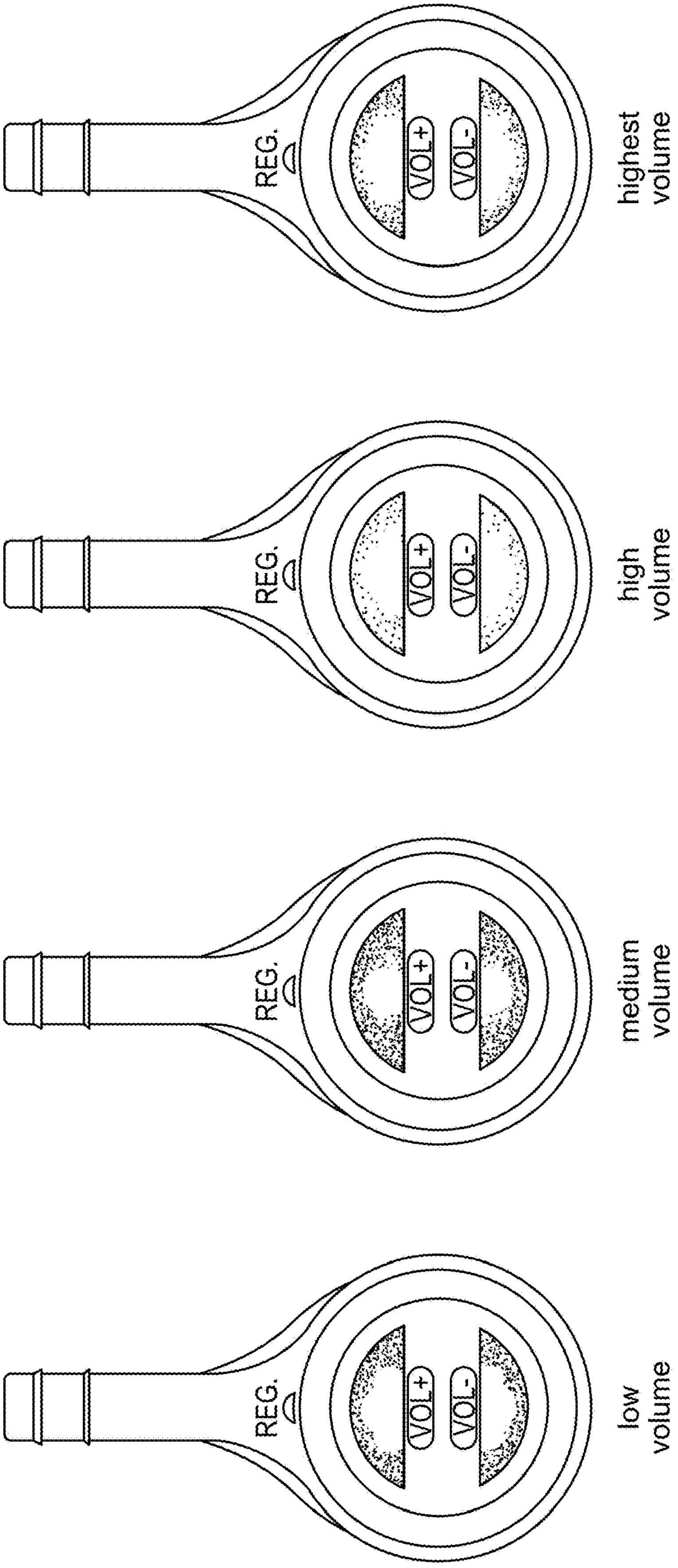
FIG. 7 depicts the 4 major volume levels associated with the headphones.

In one embodiment, the volume level of the headphones may be adjusted and the headphones may display a different color depending on the level of volume. In one non-limiting example depicted in FIG. 7, there are 4 major volume levels that correspond to color and flashing speed. Blue is the lowest, green is medium, yellow is high, and red is the highest. Within each major volume level, there are 4 clicks of the plus or minus buttons for the intermediate volume levels. To increase the volume press the (+) button and to decrease the volume level, press the (−) button. Holding either of these buttons will change the volume quickly. The maximum volume has been reached when the lights are solid red, and the minimum volume has been reached when the lights are solid blue.

Figure 8:
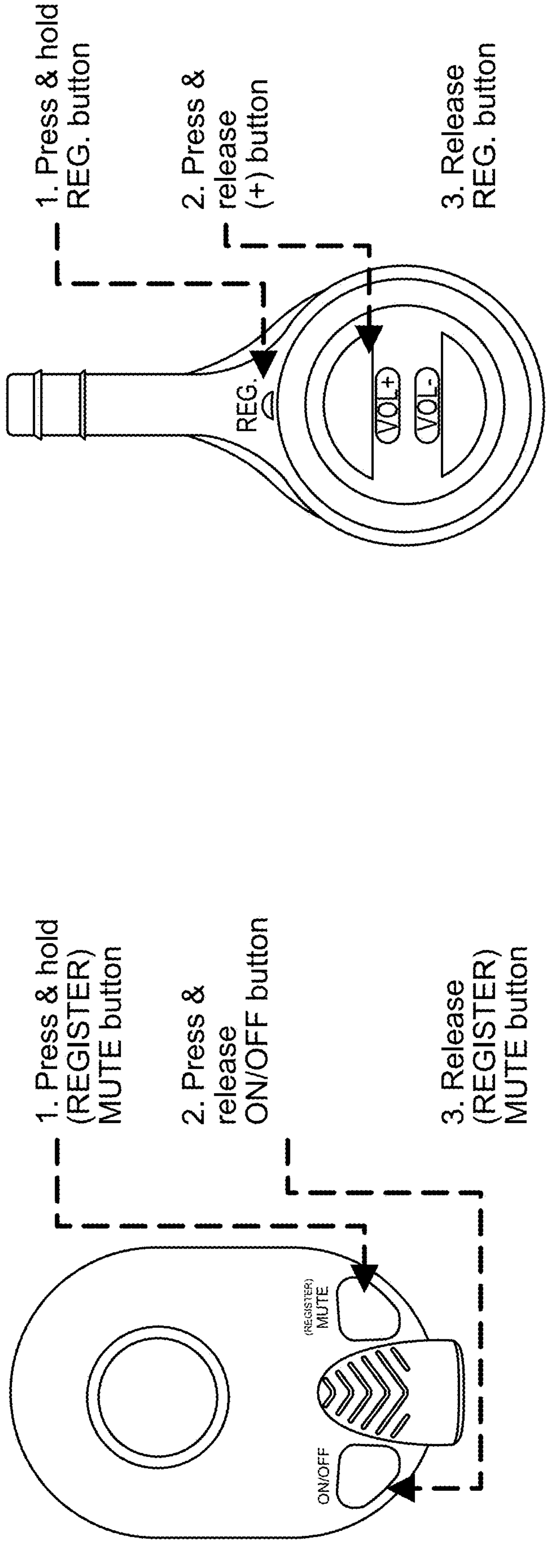
FIG. 8 depicts the procedure that is used to re-establish registration between the microphone transmitter and headphones.

If headphones and microphone transmitters become unregistered, then the following procedure is used to re-establish the association (registration) between the microphone transmitter and headphones (see FIG. 8). (1) To register a headphone to the microphone transmitter, ensure the microphone transmitter and headphones are off. Press and hold the (REGISTER) MUTE button on the transmitter, press and release the ON/OFF button, and then release the (REGISTER) MUTE button. Wait a few seconds and the light will blink rapidly. (2) Hold the registration (REG.) button on the headphone above the (VOL+) button, press and release the (VOL+) button, then release the registration button. The headphone is registered when the flashing blue light turns solid, and then turns off. The flashing should be at the same rapid speed as the transmitter. (3) To exit registration mode, power off the microphone transmitter. The microphone transmitter will return to its normal mode once powered back on.

Figure 11:
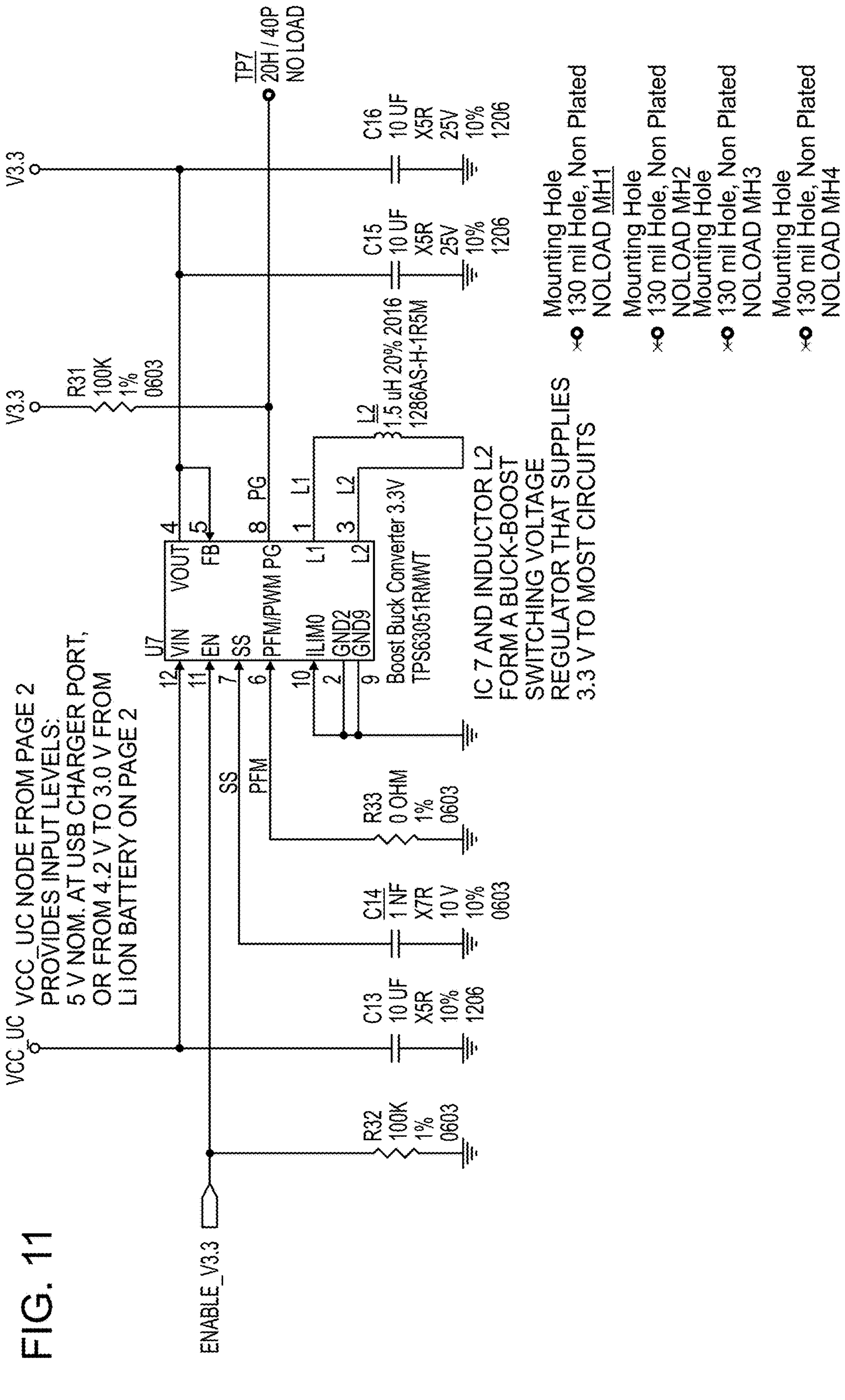
FIG. 11 depicts a buck-boost switching voltage regulator used in the present invention's microphone transmitter.
Figure 12:
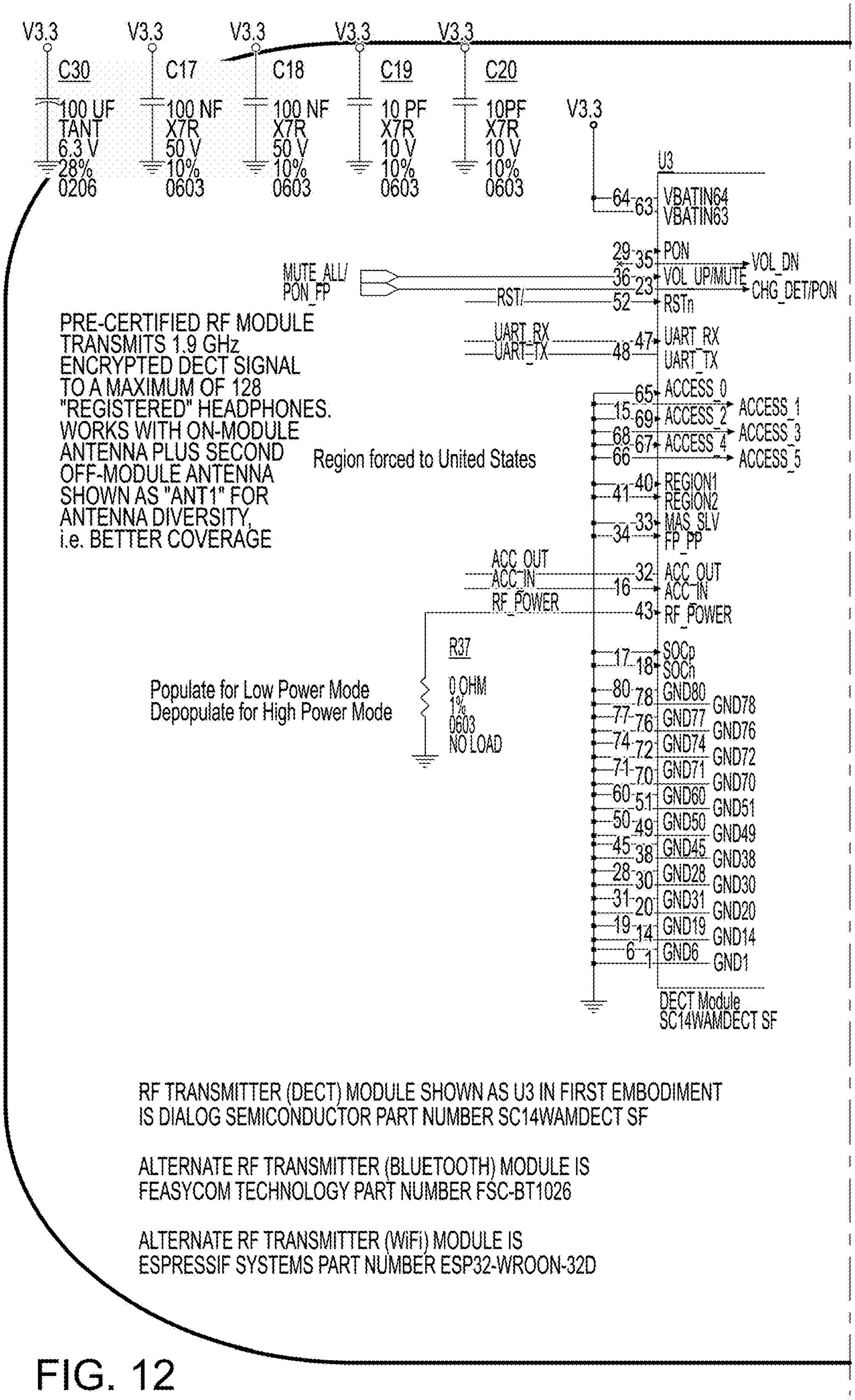
FIG. 12 depicts the components of an RF DECT Transmitter used in the present invention's microphone transmitter.
Figure 12:
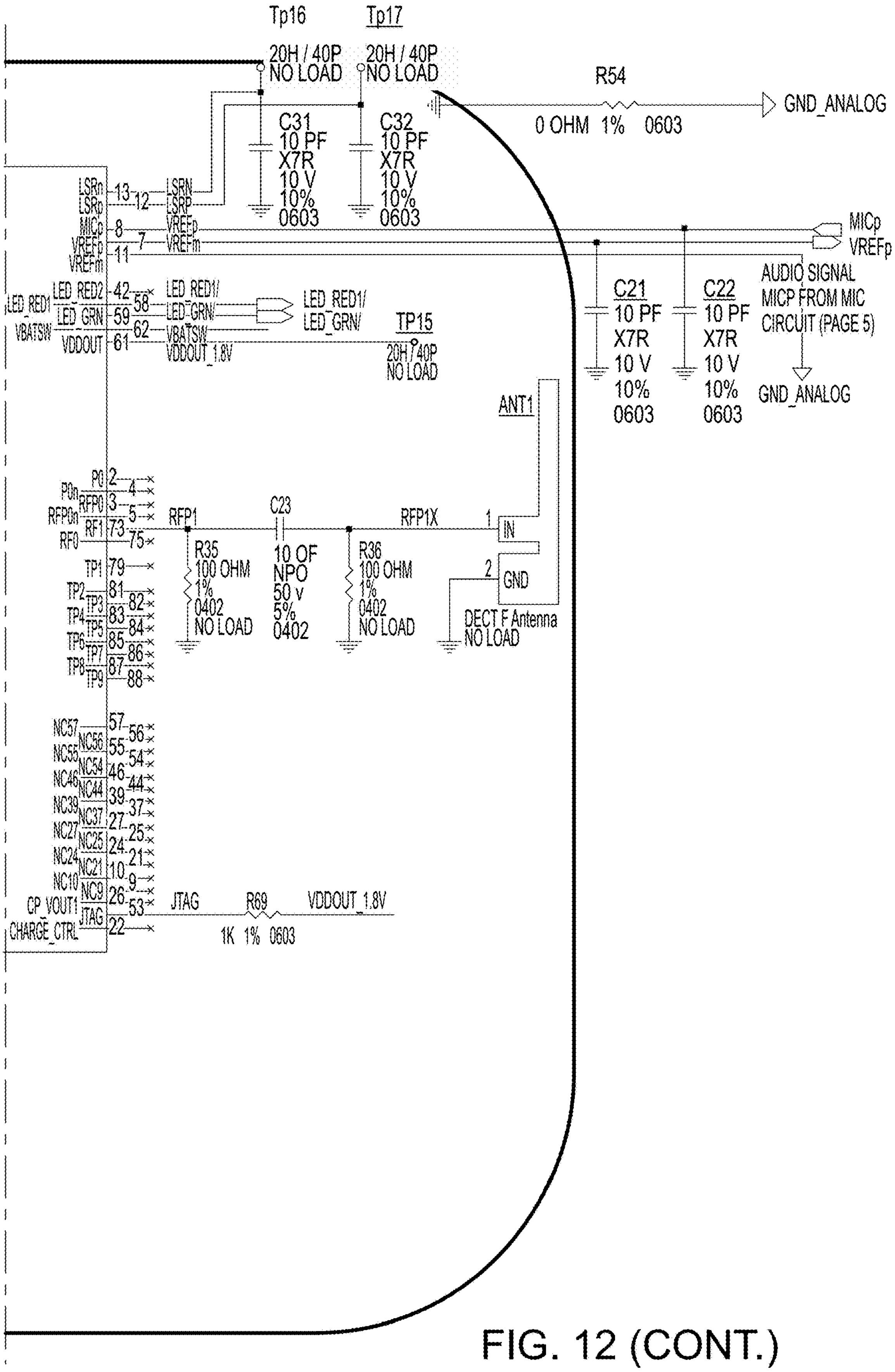
Figure 13:
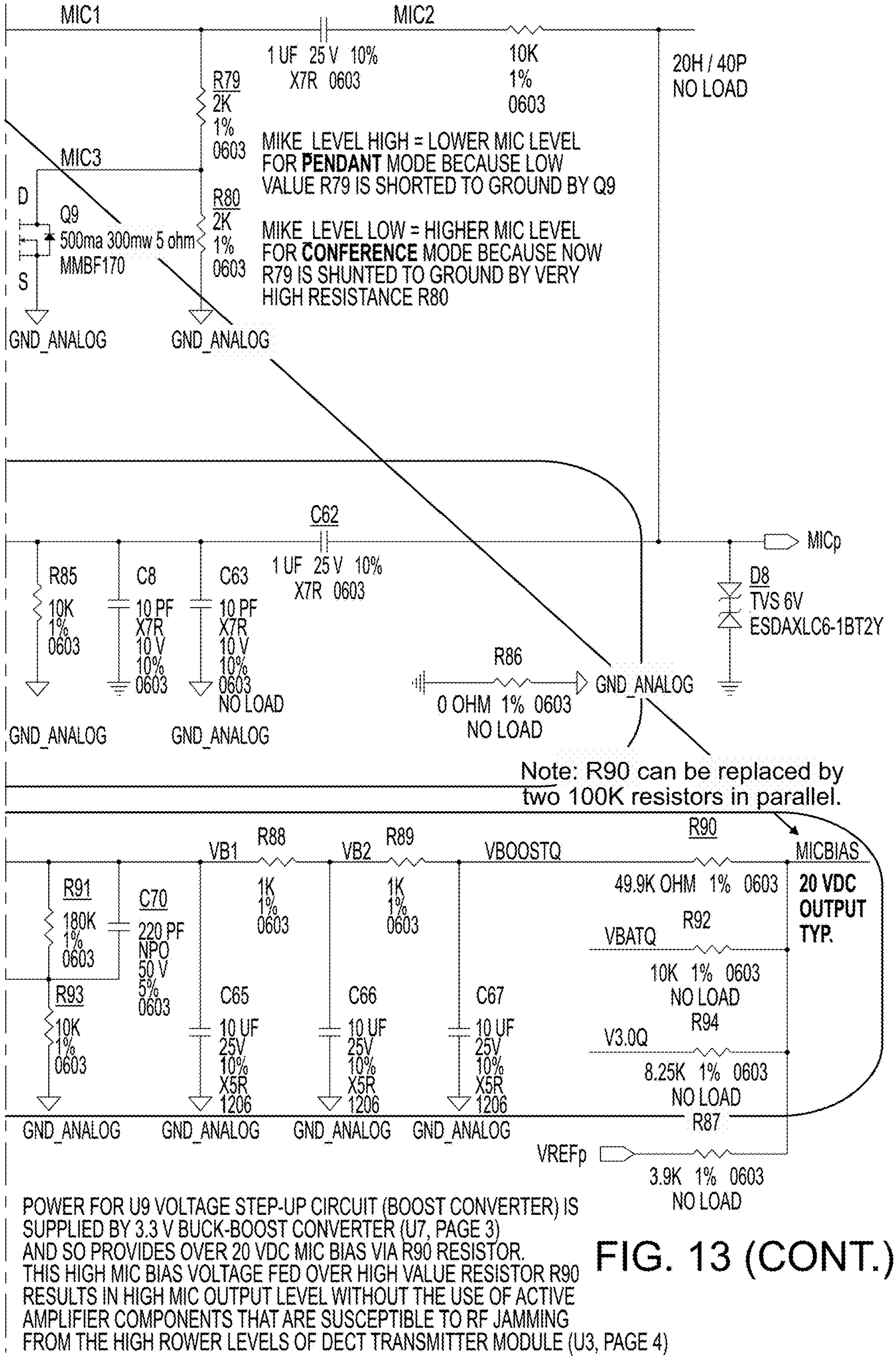
FIG. 13 depicts a DECT microphone transmitter according to one embodiment of the present invention wherein the microphone output is switched between two levels, or muted.
Figure 14:
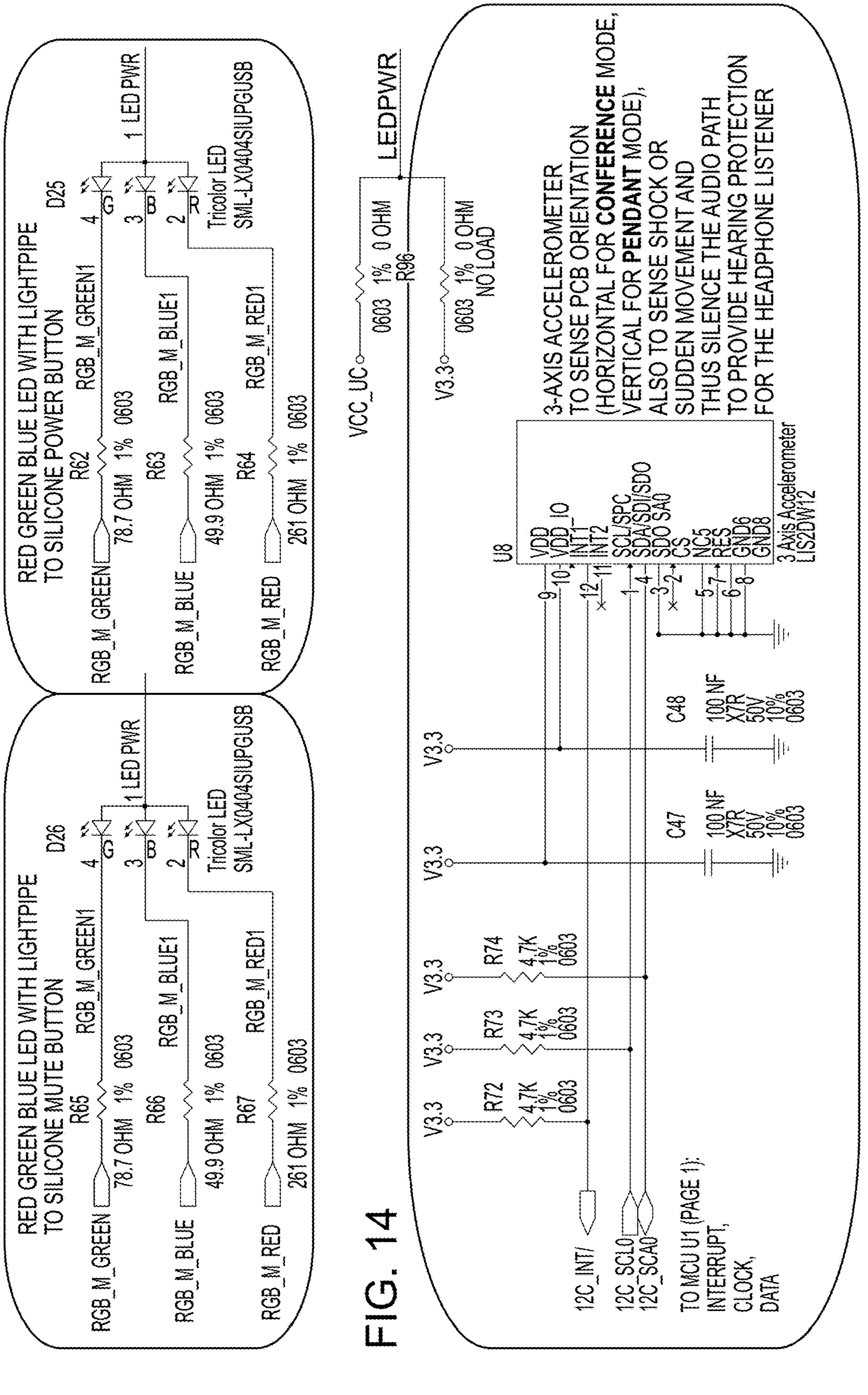
FIG. 14 depicts the following components of the microphone transmitter: the mute-button LEDs, the power-button LEDS, and the accelerometer.
Figure 16:
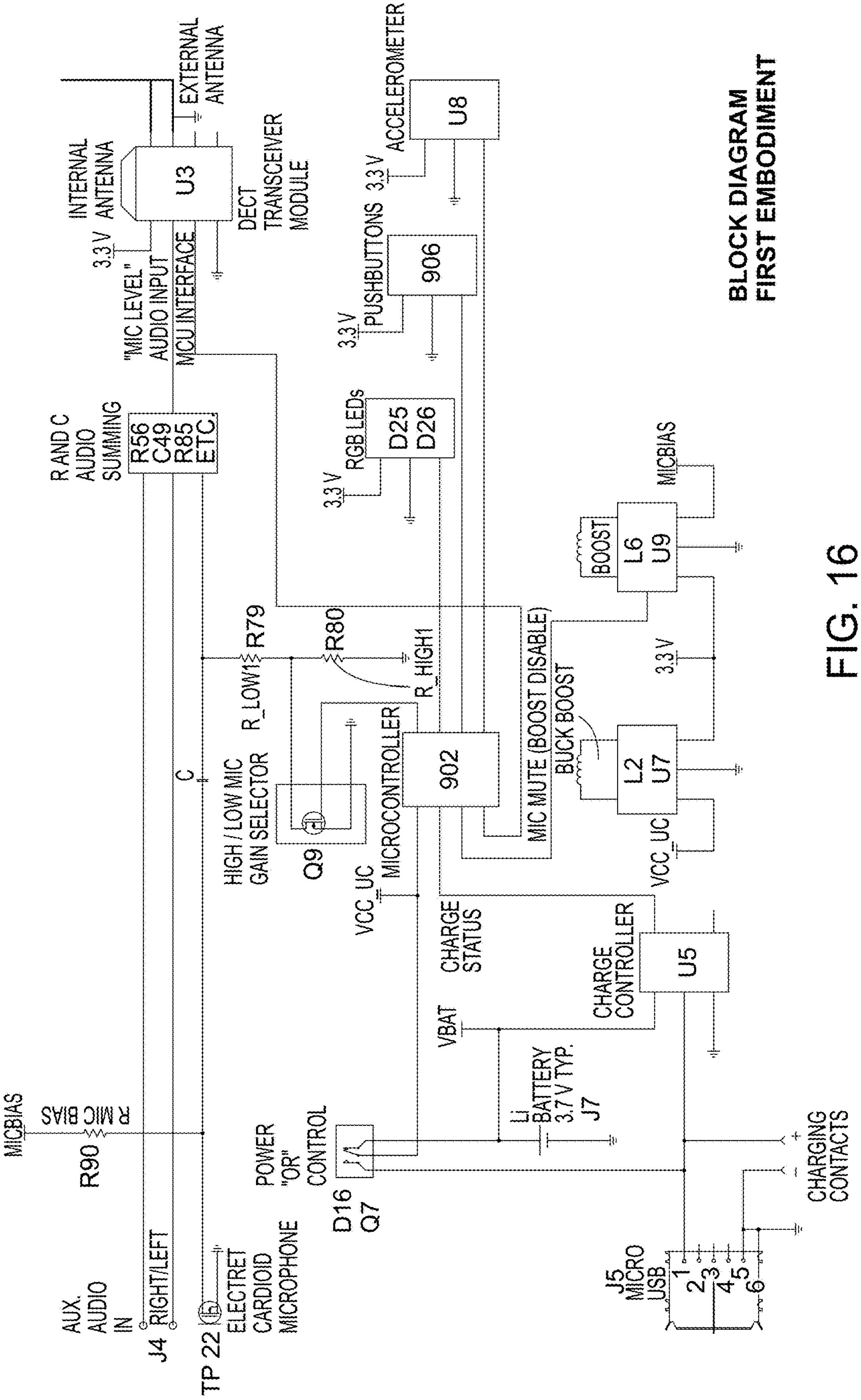
FIG. 16 depicts an overall architecture according to the first embodiment of the present invention.

FIG. 16 depicts an overall architecture according to the first embodiment of the present invention. FIG. 16 depicts all relevant circuit blocks of the first embodiment, as disclosed with reference to FIGS. 9-14. Furthermore, FIG. 16 also depicts the interconnection among the circuit blocks. Most circuits operate at 3.3 V as shown, the 3.3 V originating at the output of buck/boost regulator U7 with L2 (FIG. 11). Input power for U7 and microcontroller 902 (FIG. 9) is obtained from a "wired OR" connection of Q7 or D16 (FIG. 10) as VCC_MC while the two inputs of the "wired OR" block are the micro USB receptacle J5 and the lithium battery at J7. Charge controller U5 is connected to J5 for DC power and to microcontroller 902 for reporting charge status. Boost converter U9 with L6 provides 20 V at MIC BIAS (FIG. 13). This high, boosted voltage is applied to the microphone at TP22 via 49.9 kΩ microphone bias resistor R90. The microphone signal path is shunted to ground by series resistors R79 2 kΩ, R80 2.2 MΩ (FIG. 13). At the junction of R79 and R80, FET Q4 when directed by microcontroller 902 (FIG. 9) will determine microphone gain, high gain when Q4 is off, low when on. Audio signals from the microphone at TP22 and left/right auxiliary port J4 (FIG. 13) are summed and scaled down to "MIC LEVEL" of about 10 mV by R and C components in the audio path, as needed for transmission by DECT module U3 (FIG. 12). Microcontroller 902 also receives signals from accelerometer U8 (FIG. 14), reads inputs from pushbuttons 906 (FIG. 9) and controls RGB LEDs D25, D26 (FIG. 14).

In one embodiment, the present invention provides a microphone transmitter comprising: (a) a portable housing; (b) a microcontroller; (c) a microphone receiving sound arriving via a first port and a second port located in the portable housing and generating a microphone input signal, the microcontroller providing a noise-control signal based on whether noise or speech is arriving at the microphone ports, and generating a noise-attenuated signal output in the absence of speech; (d) a transmitter circuit operable for transmitting the noise-attenuated signal; (e) an accelerometer circuit configured to generate an orientation signal based on a sensed orientation of the portable housing, (f) a power source configured to power the microcontroller, the microphone, the transmitter circuit, and the accelerometer circuit, wherein the power source, the microcontroller, the microphone, the transmitter circuit, the accelerometer circuit are located within the portable housing, and wherein the microcontroller receives the orientation signal and operates in a high gain mode when the portable housing is in a horizontal position or in a low gain mode when the portable housing is in a vertical position.

Figure 9:
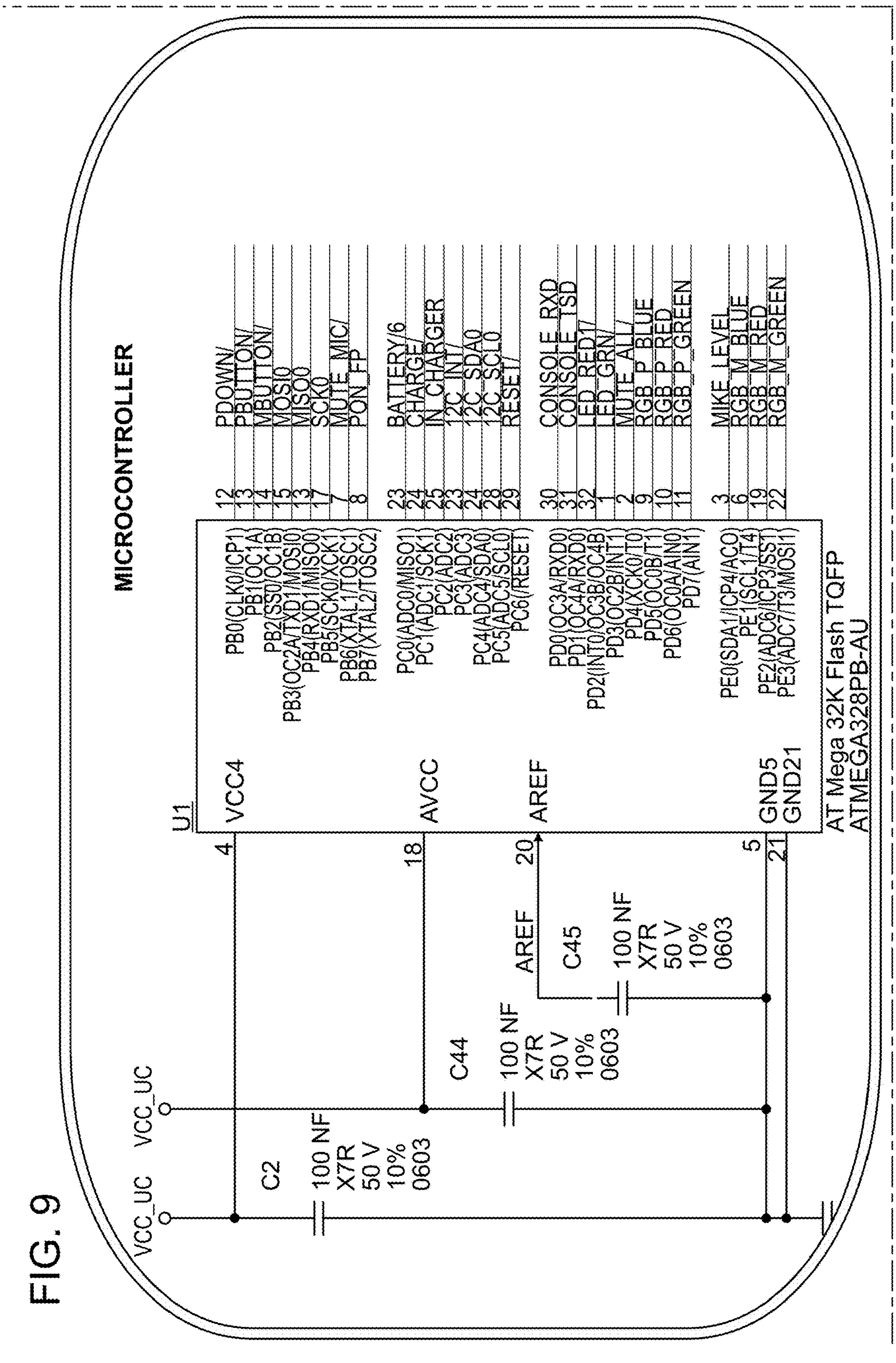
FIG. 9 depicts a non-limiting example of the microcontroller used in the present invention's microphone transmitter, the components for programming and tuning microphone noise masking performance, and the components for pushbuttons for power and mute.
Figure 9:
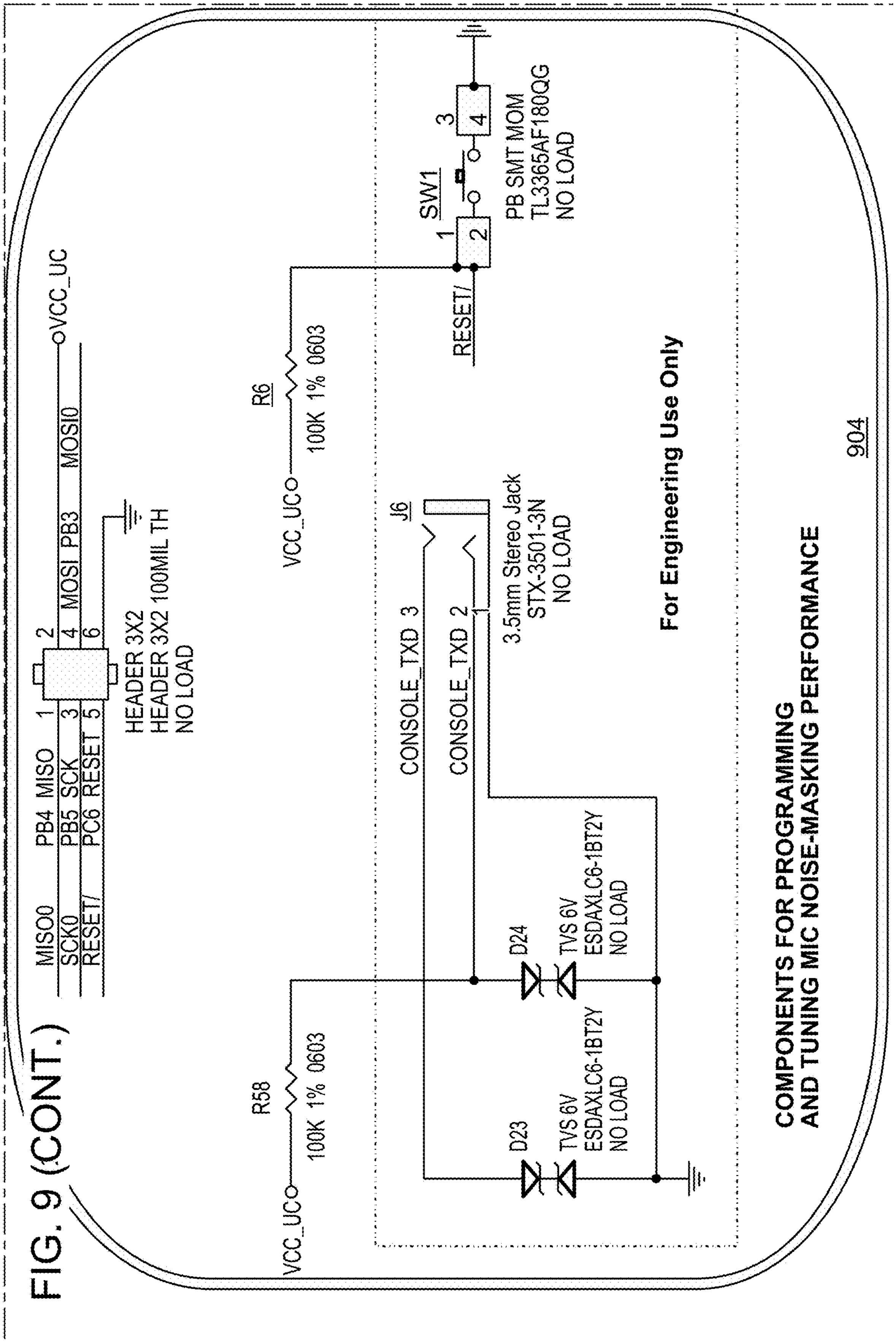
Figure 9:
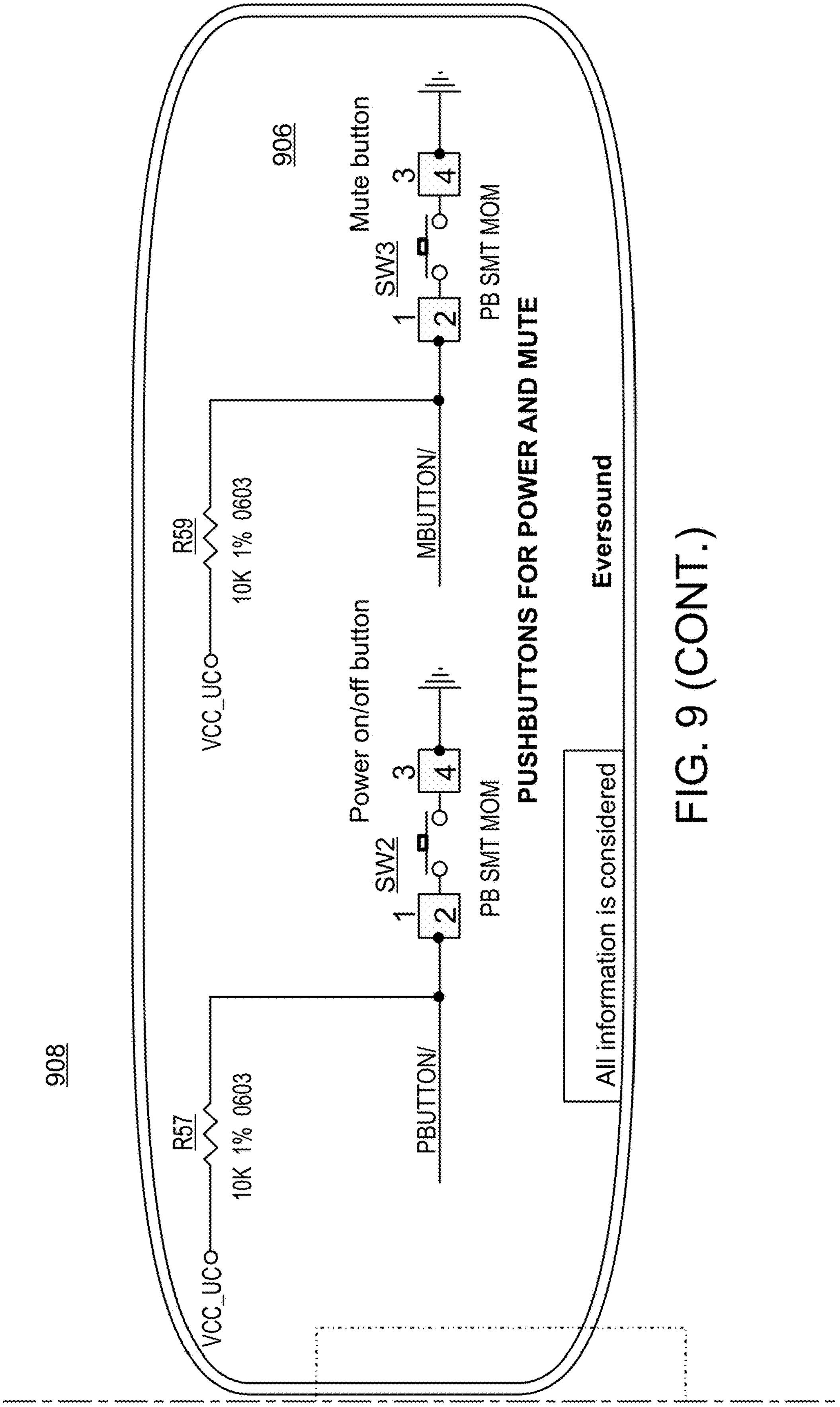

FIG. 9 depicts a non-limiting example of the microcontroller 902 used in the present invention's microphone transmitter, the components for programming and tuning microphone noise masking performance 904, and components for pushbuttons for power and mute 906. 902 is the microcontroller that monitors or controls most circuits via In/Out pins at right edge, including mic gain pin 3 "Mike Level". 904 facilitates programming the microcontroller and also adjust mic gain levels during software development. 906 is a schematic of on/off momentary switch SW2, mute/register momentary switch SW3.

Figure 10:
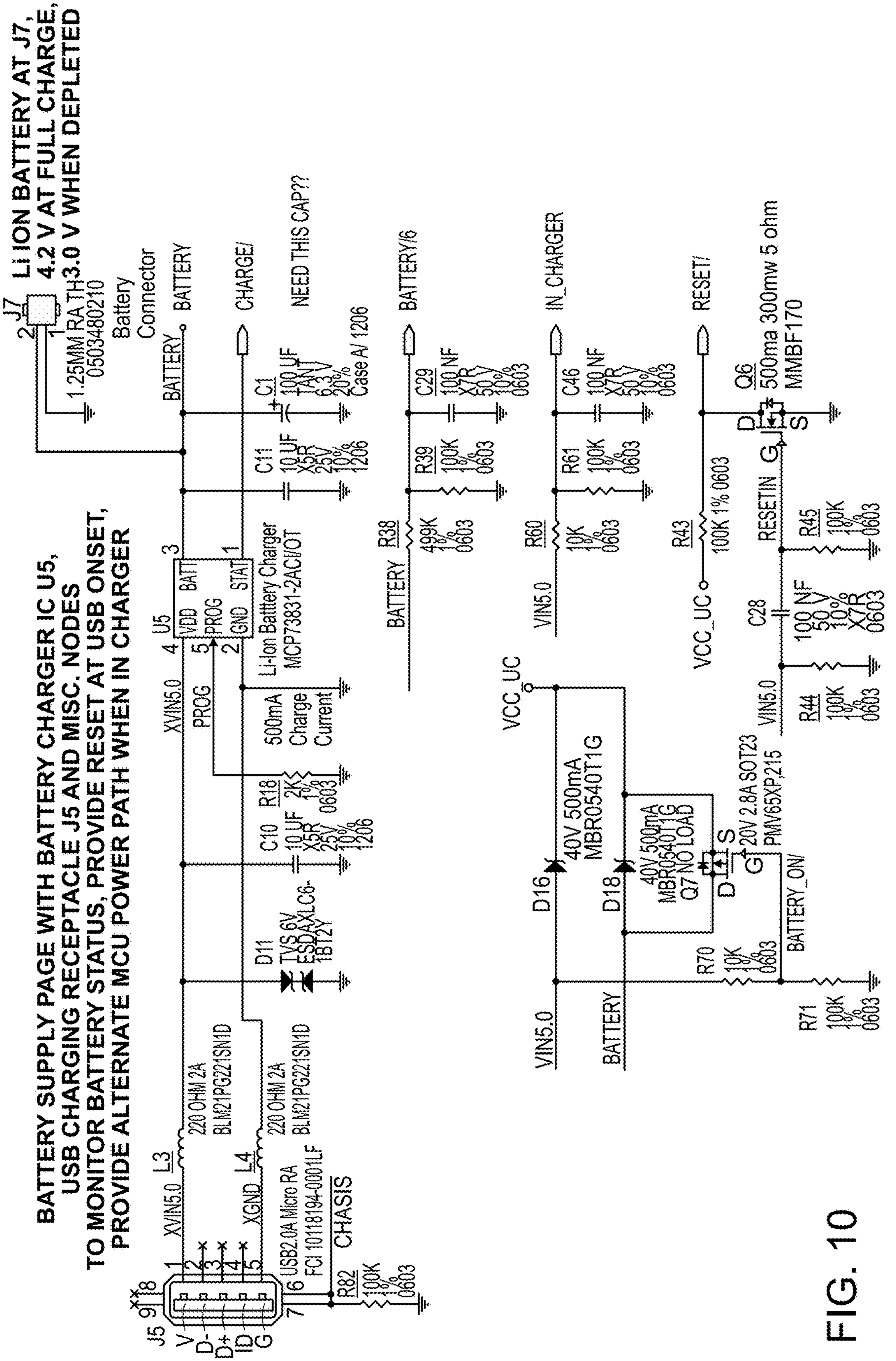
FIG. 10 depicts the components of the power source used in the present invention's microphone transmitter.

FIG. 10 depicts the components of the power source used in the present invention's microphone transmitter. J5 refers to a micro-USB receptable for charging. TP4, TP5 are contact points on PCB for charging via coil springs as shown in FIG. 15F. U5 is a charge controller for the battery that connects at J7, U5 also declares "Charge/" status to MCU 902 shown in FIG. 9. D16, D18, Q7 conduct power from either the battery or the charging port to VCC_UC for all other circuits. Q6 provides a "Reset/" pulse to microcontroller when charging power is first connected, while resistors and capacitor at "battery/6" (FIG. 10) provide the battery voltage level to the microcontroller and other resistors and capacitor at "In charger" (FIG. 10) notify the microcontroller that a charger is present.

FIG. 11 depicts a buck-boost switching voltage regulator used in the present invention's microphone transmitter. U7 is a Buck-Boost converter IC provides regulated 3.3V from unregulated voltage source "VCC_UC" in FIG. 9 when the On/Off button is pressed so as to direct the microcontroller to turn on U7 via "Enable_V3.3V". Inductor L2 provides energy storage under control of U7 for a regulated 3.3V Level when the battery is above 3.3V (Buck Mode) or below 3.3V (Boost Mode).

FIG. 12 depicts the components of an RF DECT Transmitter used in the present invention's microphone transmitter. U3 is a complete DECT 6.0 transceiver module (SC14WAMDECT SF by Dialog Semiconductor GmbH) that processes the analog microphone signal form "MICp" in FIG. 13 to transmit an encrypted digital signal to several headphones. When U3 receives digital request signals from each headphone, it permits only registered headphones to receive the microphone signal.

FIG. 13 depicts a DECT microphone transmitter according to one embodiment of the present invention wherein the microphone output is switched between two levels. In this embodiment, the present invention provides a microphone transmitter comprising: (a) a portable housing; (b) a microcontroller; (c) a microphone receiving sound arriving via a first port and a second port located in the portable housing and generating a microphone input signal, the microcontroller providing a noise-control signal based on whether noise or speech is arriving at the microphone ports, and generating a noise-attenuated signal output in the absence of speech; (d) a transmitter circuit operable for transmitting the noise-attenuated signal; (e) a high-voltage bias circuit (MICBIAS in FIG. 13) comprising a voltage step-up circuit (e.g., a step-up circuit (boost converter) is supplied by a 3.3 V from the buck-boost converter output "V3.3" in FIG. 11 and provides over 20 VDC microphone bias via resistor R90 that results in high microphone output level without use of active amplifier components that are susceptible to RF jamming from the high power levels of the DECT transmitter module) configured to generate a high microphone output level signal for the noise-attenuated signal; (f) an accelerometer circuit configured to generate an orientation signal based on a sensed orientation of the portable housing; (g) a microphone level adjustment circuit receiving the high microphone output level signal, the microphone level adjustment circuit comprising one or more field-effect transistors (FETs) (Q9 in FIG. 13), the microphone level adjustment circuit, upon receiving instructions from the microcontroller, configured to operate either in a high gain mode when the portable housing is in a horizontal position or in a low gain mode when the portable housing is in a vertical position, wherein the FETs (Q9 in FIG. 13) are turned on to increase a microphone level when the portable housing is in the horizontal position and the FETs (Q9 in FIG. 13) are turned on to decrease the microphone level when the portable housing is in the vertical position; (h) a transmitter circuit operable for transmitting output of the microphone level adjustment circuit; (i) a power source configured to power the microcontroller, the microphone, the high-voltage bias circuit, the accelerometer circuit, the microphone level adjustment circuit, and the transmitter circuit; wherein the power source, the microcontroller, the microphone, the high-voltage bias circuit, the accelerometer circuit, the microphone level adjustment circuit, and the transmitter circuit are located within the portable housing. The microphone level adjustment circuit further comprises a first resistor (R79 in FIG. 13) and a second resistor (R80 in FIG. 13) where R80/R79 >1000. When the FET (Q9 in FIG. 13) is turned off, the microphone level is increased by shunting R79 to ground by higher resistance R80, and when the FET (Q9 in FIG. 13) is turned on, the microphone level is decreased as the low value of R79 is shorted to ground by the FETs (Q9 in FIG. 13).

It should be noted that in FIG. 13, the microphone in the preferred embodiment is an electret microphone. Additional information on electret microphones may be found in, U.S. Pat. Nos. 5,978,491 A, 6,266,424 B1, 6,504,937 B1, 6,580,797 B1, all of which are fully incorporated by reference. It has been shown that high resistance and high voltage are advantageous for providing a high microphone output level. Typically, electret microphones such as Primo EM247 are connected to 3 VDC by a 2 kΩ resistor, in other words from a low voltage via a low microphone-bias resistor value. FIG. 13 shows the microphone (upper left) is connected to 20 VDC by 49.9 kΩ resistor R90. The increase in the microphone output level is 49.9/2=25 or 14 dB, as shown below. This high voltage approach for obtaining microphone gain is counterintuitive, however, it is immune to RF interference from the transmitter in the present invention. The component providing "RF-immune gain" is a passive resistor, not an active circuit such as an op-amp. U.S. Pat. Nos. 5,978,491 A, 6,266,424 B1, 6,504,937 B1, 6,580,797 B1, all discuss electret microphones, the internal JFET, why the microphone requires a bias voltage, etc. "Electret" is the term in the art for a permanently charged diaphragm inside the microphone housing, where this diaphragm vibrates responsive to ambient sound or voice. It is known in the art that the voltage gain G of a JFET (drain voltage/gate voltage) is $G=g_m R_D$ where $g_m$ is transconductance and $R_D$ is the drain bias resistor. In the 14 dB increase calculation above, $R_D$ is 2 kΩ (Primo EM247) or 49.9 kΩ (present invention).

FIG. 14 depicts the following components of the microphone transmitter: the mute-button LEDs, the power-button LEDs and the accelerometer. D25, D26 are RGB LEDs (SML0404SIUPGUSB by Lumex Opto/Components Inc.) used to indicate On/Off or charge status (D25) and mute or DECT link status (D26). U8 is a MEMS IC (LIS2DW12 by STMicroelectronics) to detect X-, Y- or Z-axis orientation relative to the Earth's gravity. I2C signals I2C_INT/, I2C_SCL0, IC2_DAO are sent to the microcontroller 902, in FIG. 9, in order to control mic gain when the mic housing is horizontal (high gain) or vertical (low gain). In addition, U8 can sense shock or free fall, so the microcontroller can mute the microphone signal thus preventing loud sounds from startling the headphone listeners.

Figure 15A:
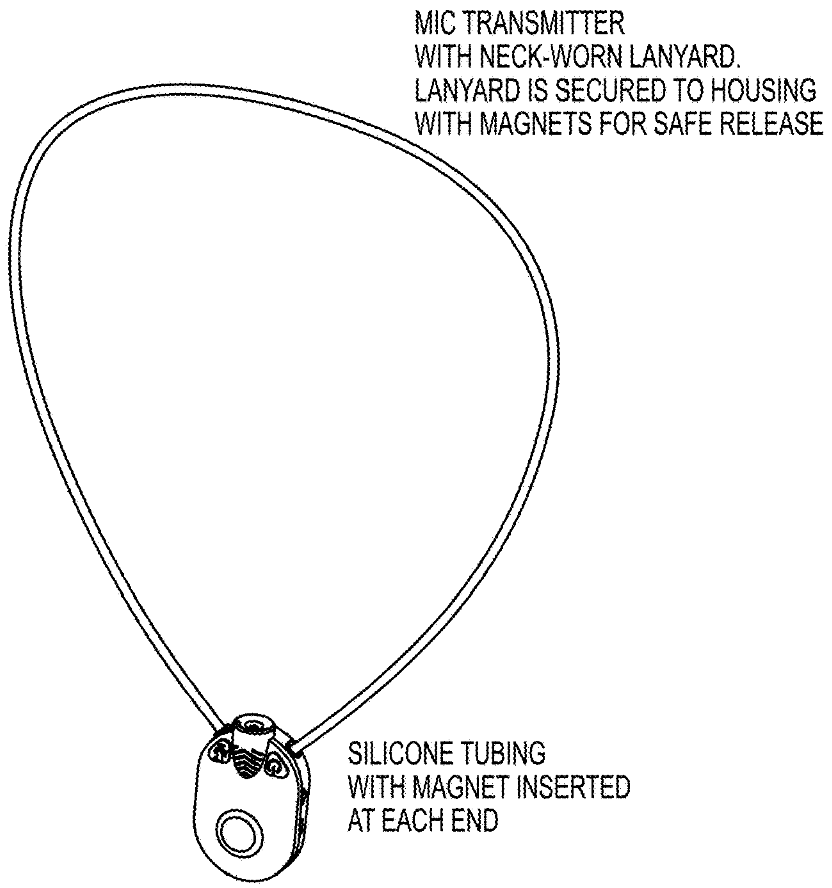
FIG. 15A depicts the microphone transmitter with a neck-worn lanyard where the lanyard is secured to the housing with magnets for safe release.
Figure 15B:
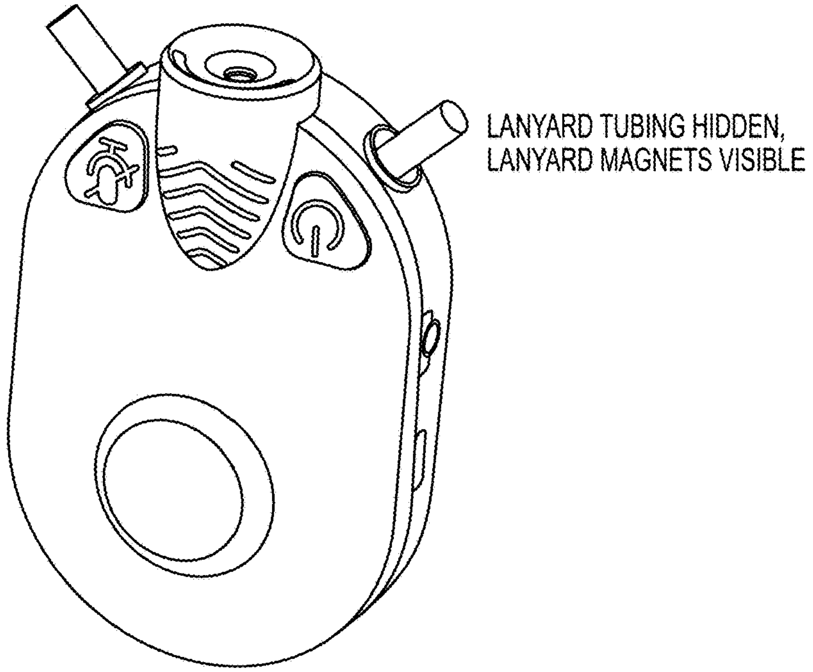
FIG. 15B depicts the microphone transmitter (in the embodiment depicted in FIG. 15A) showing the magnets while the lanyard tubing is hidden.
Figure 15C:
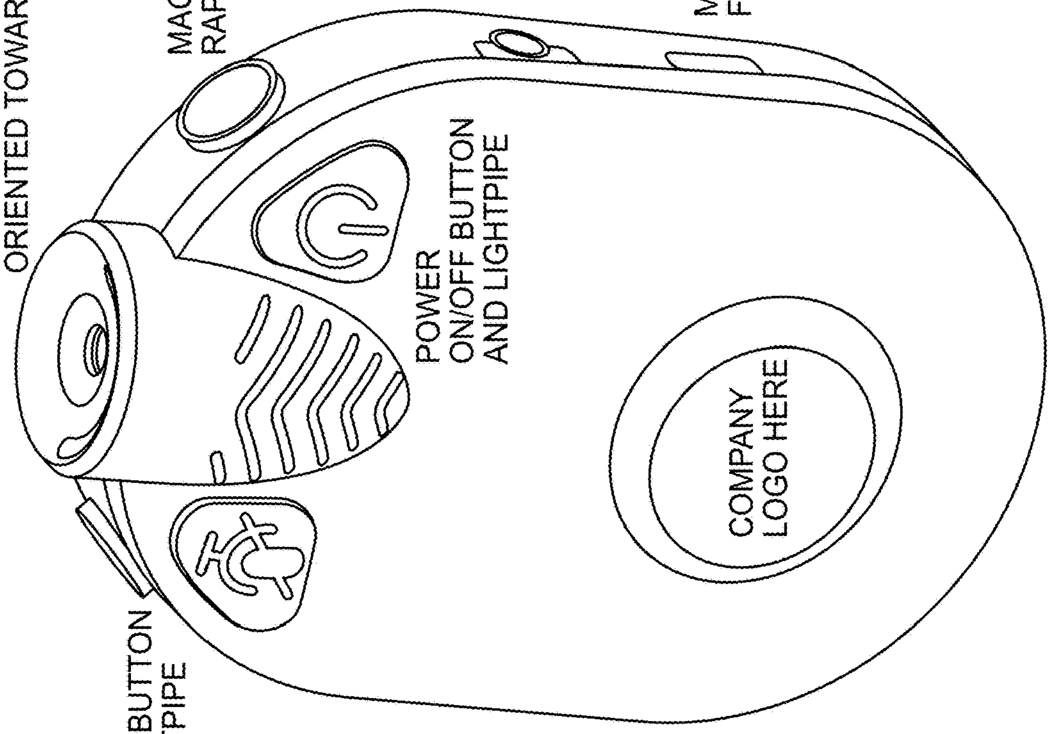
FIG. 15C depicts another view of the microphone transmitter that further depicts: (1) the front surface of the microphone housing for a unidirectional (cardioid) microphone oriented toward the user, (2) a magnetic cavity for rapid engagement of lanyard, (3) a power on/off button and light pipe, (4) a mic mute button and light pipe, (5) a 3.5 mm jack for transmitting audio from an external source, (6) a micro USB receptacle for programming or charging, and (7) a rear microphone port that is vented to ambient air by a series of "V" slots, where such rear venting allows noise cancellation via the cardioid polar pattern at 180 degrees from the microphone front surface.
Figure 15D:
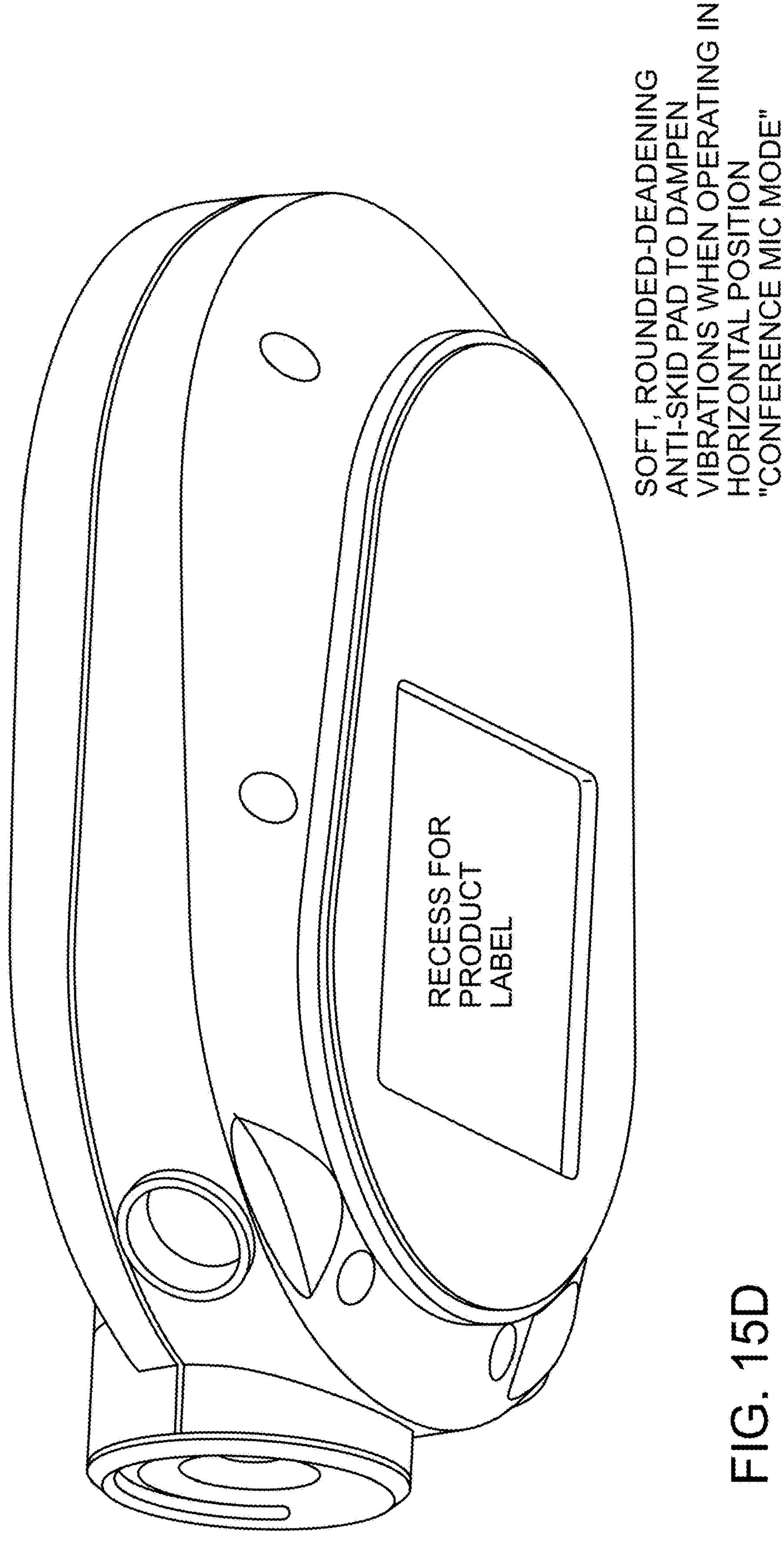
FIG. 15D depicts the microphone transmitter with a soft, sound-deadening anti-skid pad to dampen vibrations when operating in a horizontal position/"conference microphone mode".
Figure 15E:
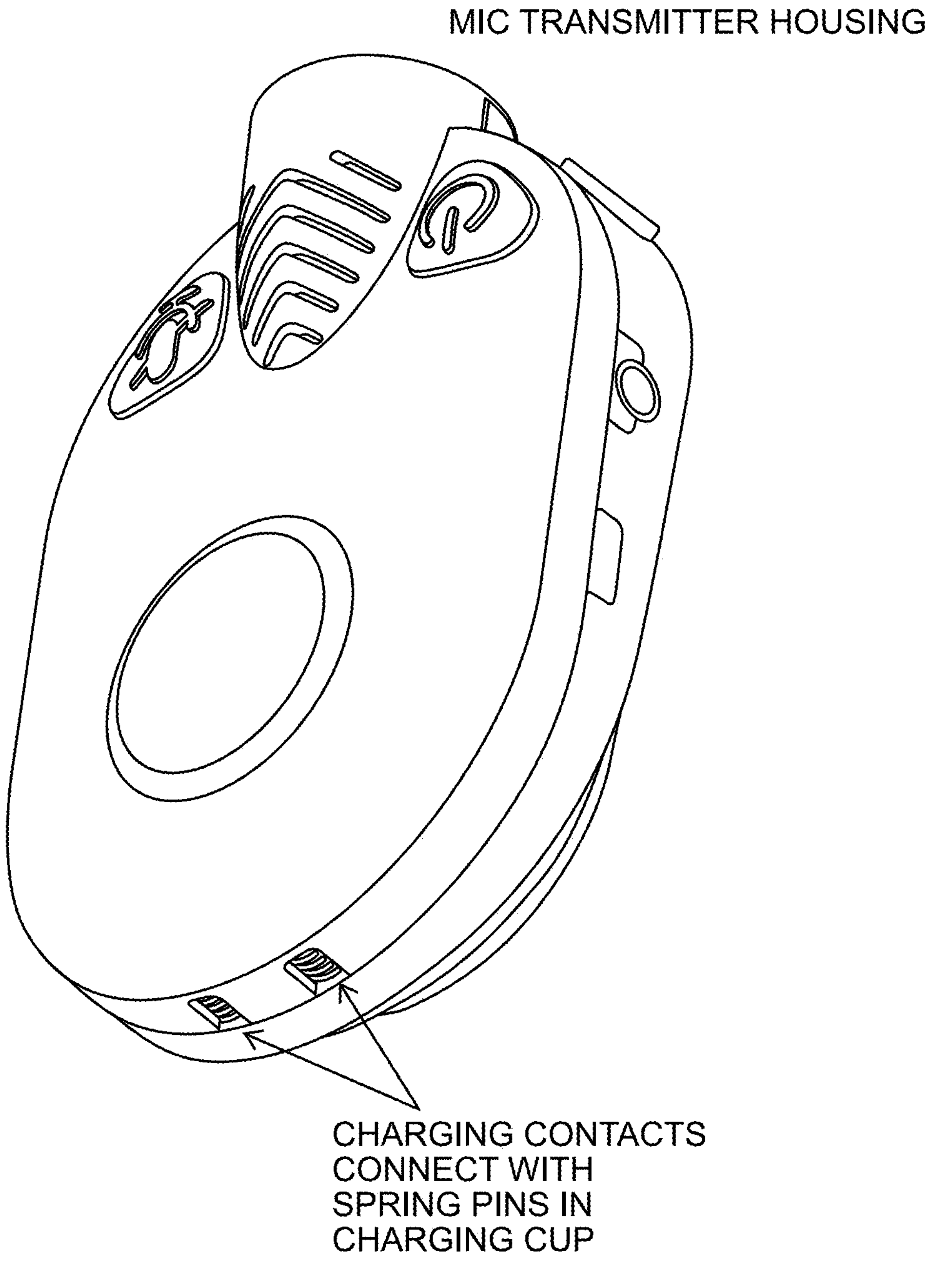
FIG. 15E depicts the microphone transmitter showing the charging contacts that connect with spring pins in the charging cup of the charger.
Figure 15F:
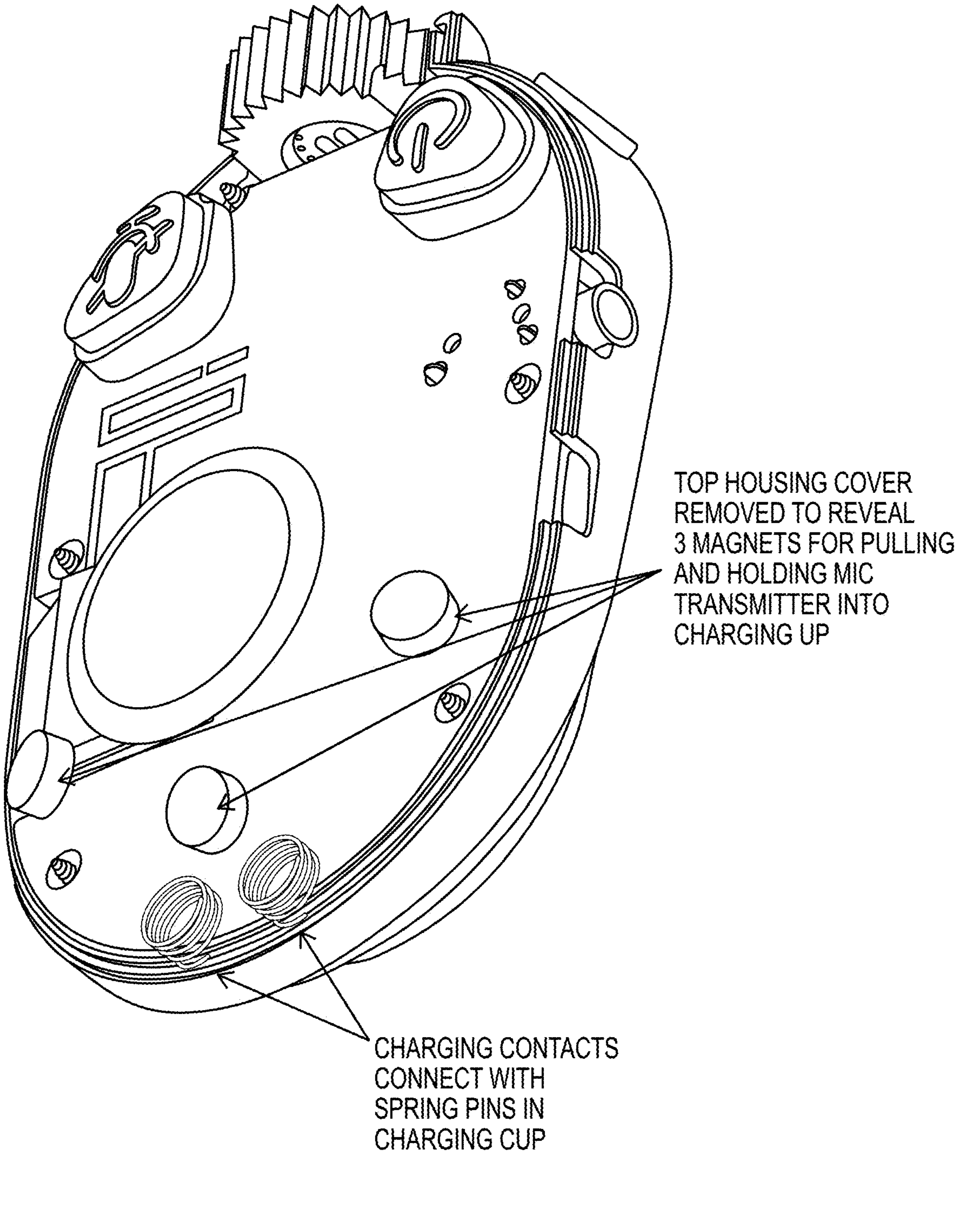
FIG. 15F depicts the microphone transmitter with the top housing cover removed to reveal three magnets for pulling and holding the microphone transmitter into the charging cup.
Figure 15G:
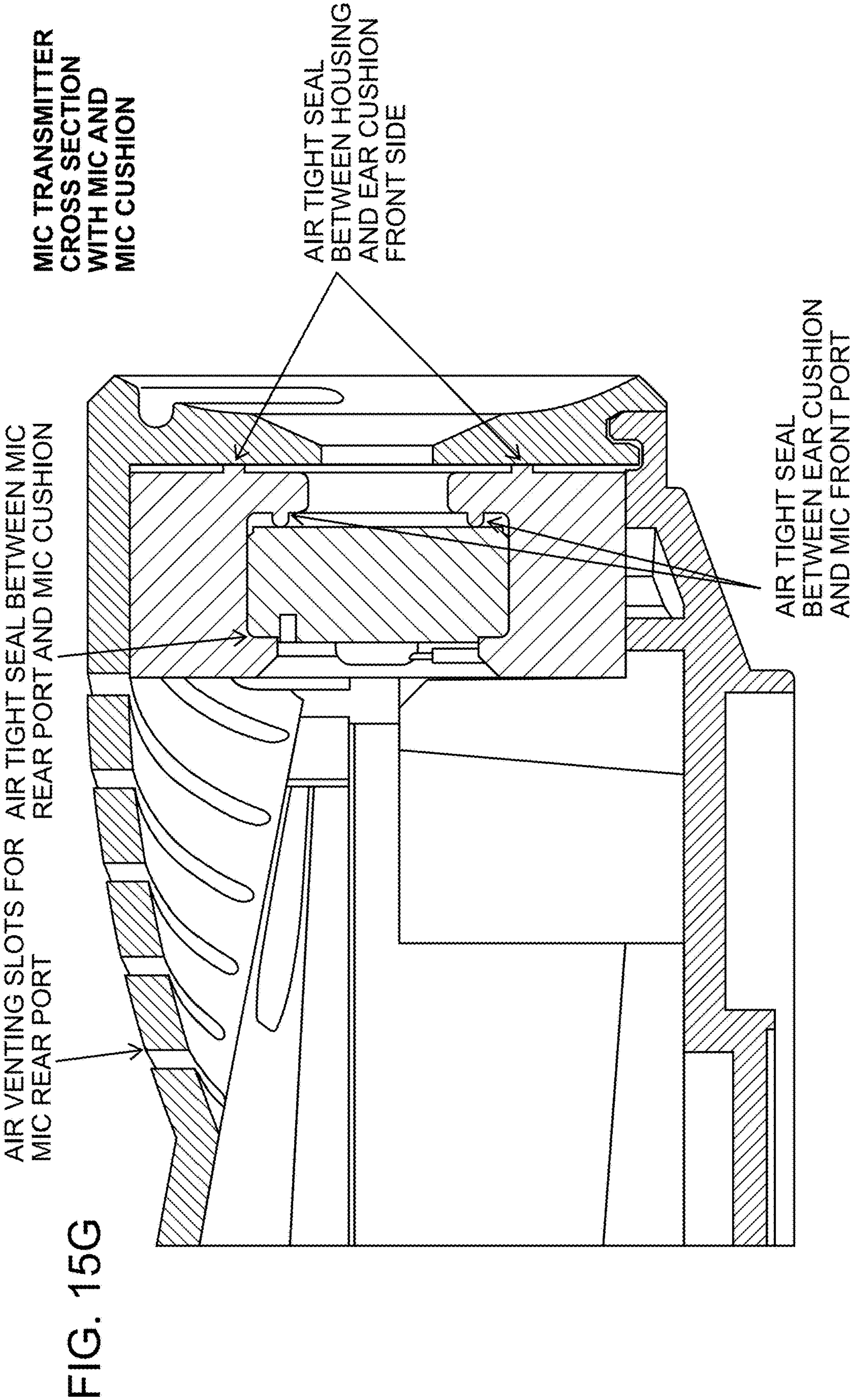
FIG. 15G depicts a cross-section of a portion of the microphone transmitter that shows the air venting slots for the microphone rear port, the airtight seal between the microphone rear port and microphone cushion, the airtight seal between the microphone cushion and the microphone front port, and the airtight seal between the housing and the microphone cushion front side.
Figure 15H:
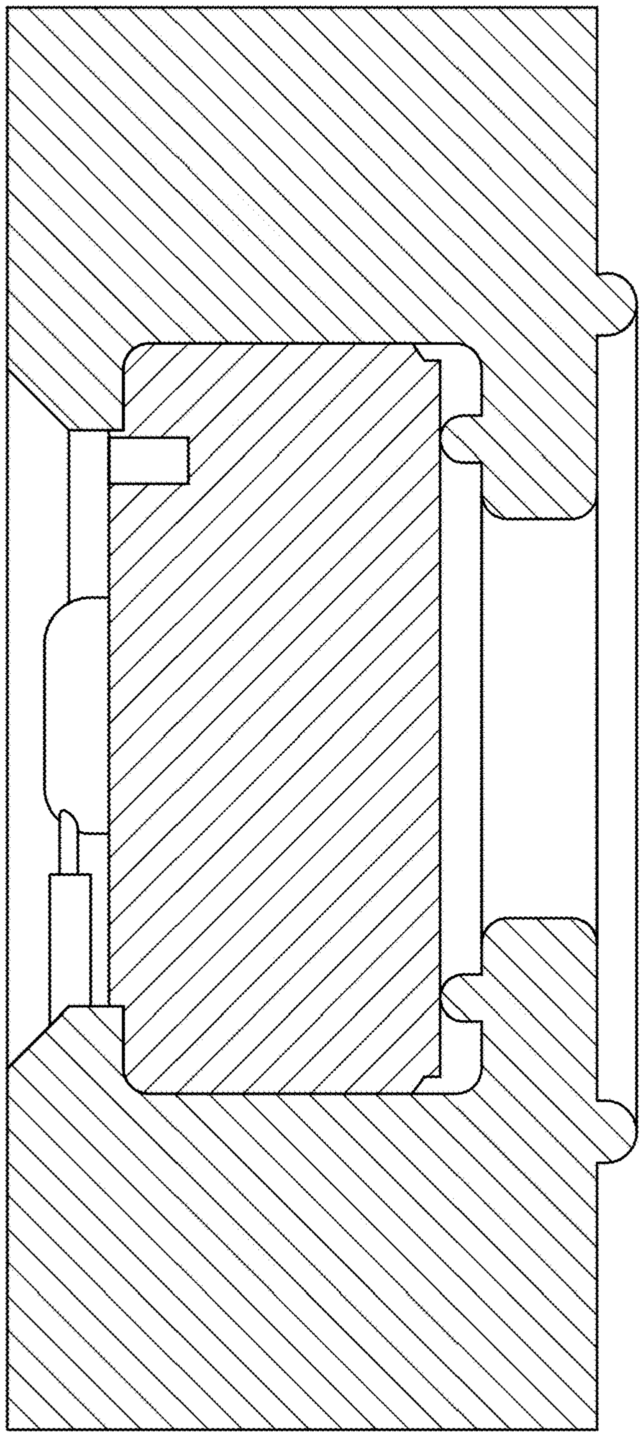
FIG. 15H depicts another view of the vertical cross-section where the microphone cushion entirely encloses the microphone.
Figure 15I:
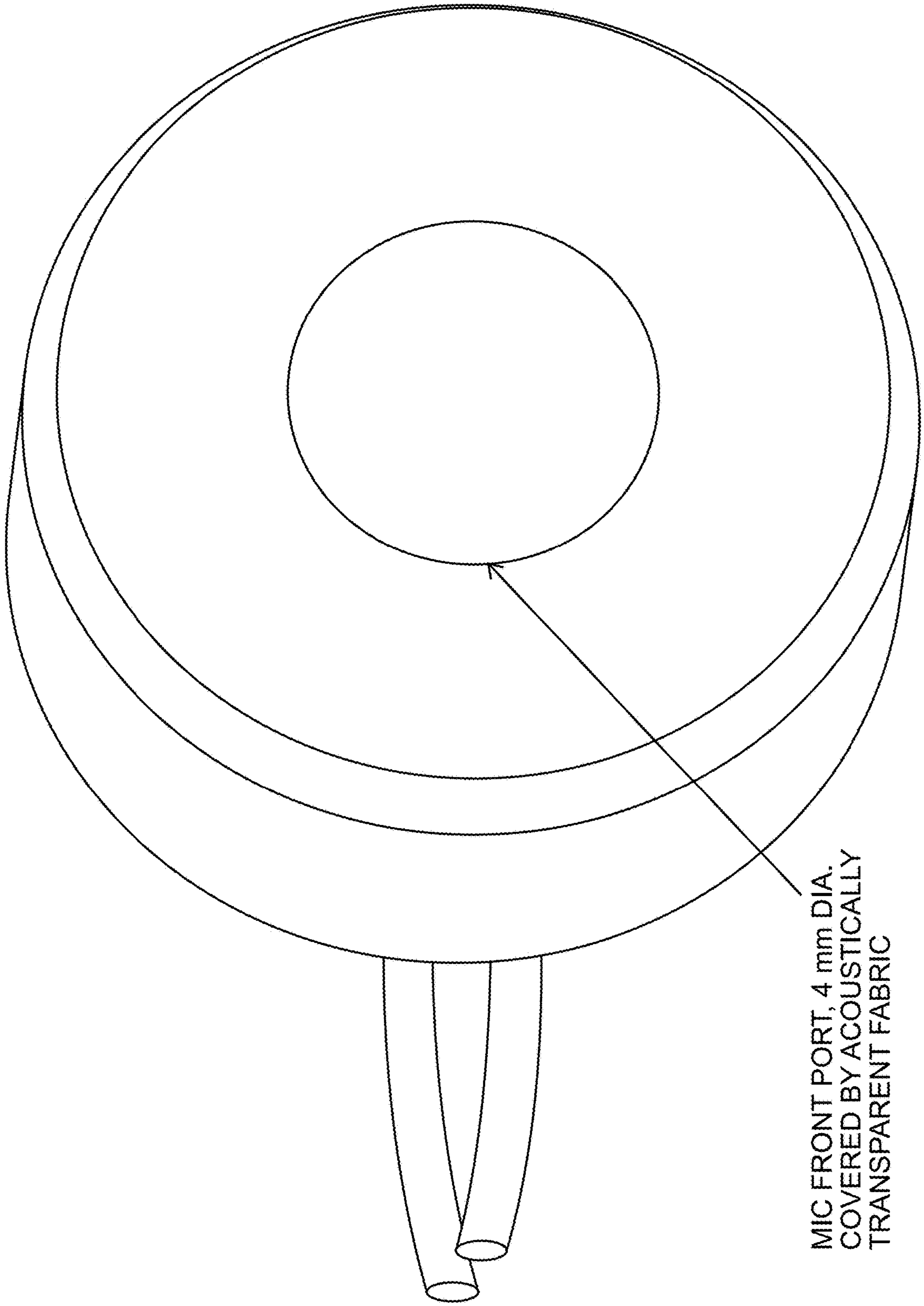
FIG. 15I depicts the microphone front port covered by an acoustically transparent fabric.
Figure 15J:
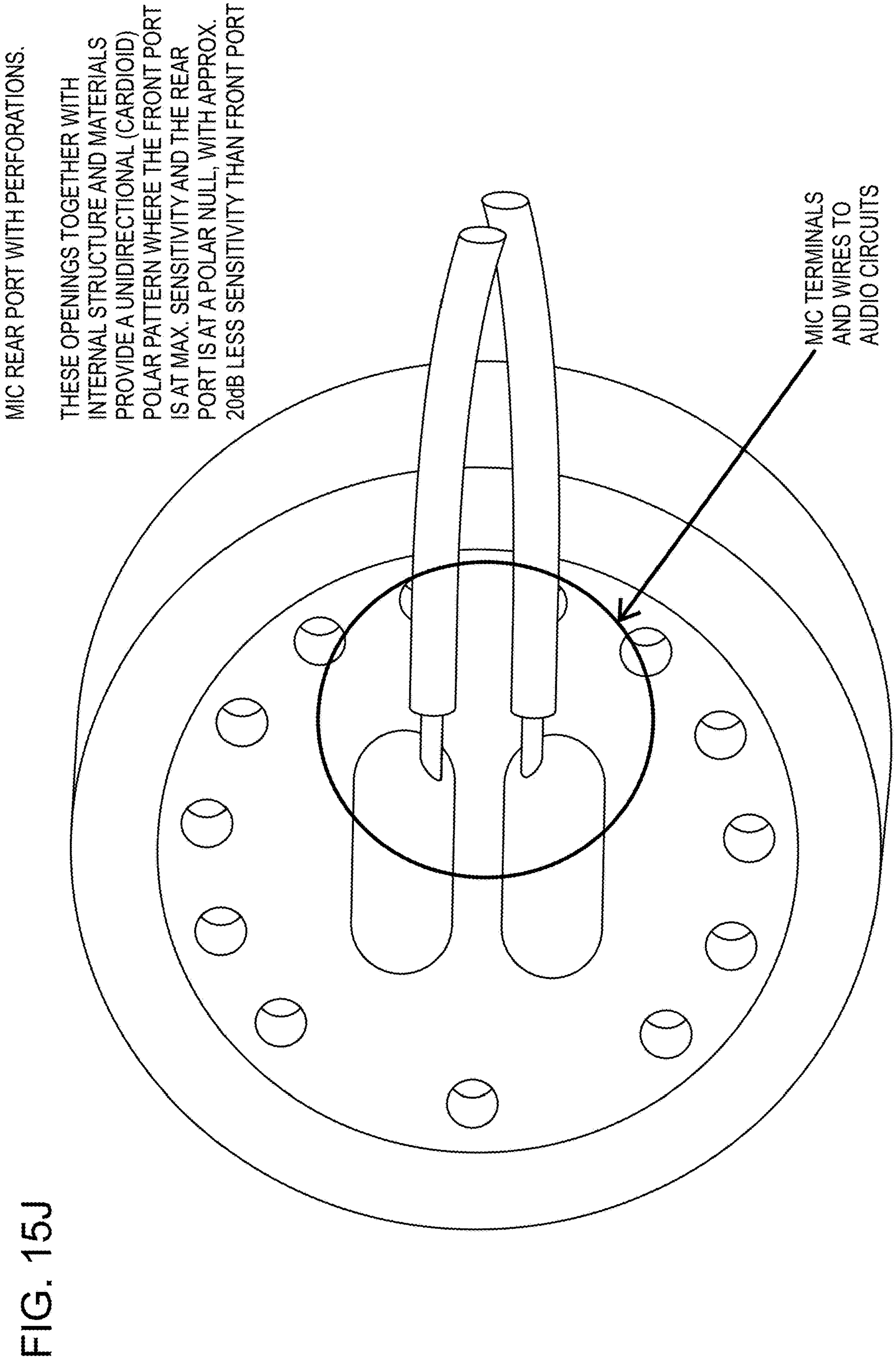
FIG. 15J depicts the microphone rear port with perforations where the openings together with the internal structure and materials provide a unidirectional (cardioid) polar pattern where the front port is at maximum sensitivity and the rear port is at a polar null, with approximately 20 db less sensitivity that front port.
Figure 15K:
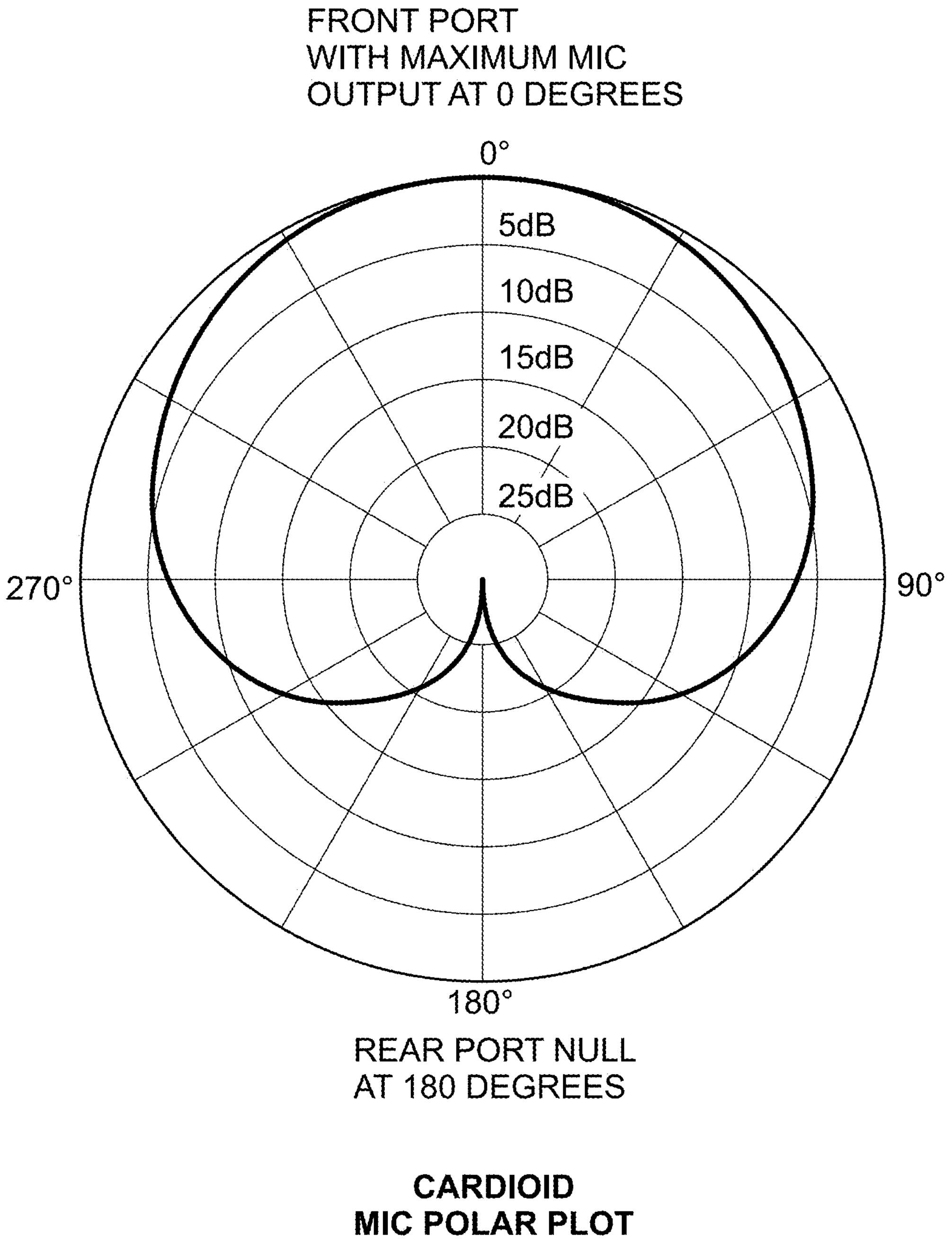
FIG. 15K depicts the cardioid pattern of the microphone polar plot showing the front port with maximum microphone output at 0 degrees and the rear port having a null output at 180 degrees.
Figure 15L:
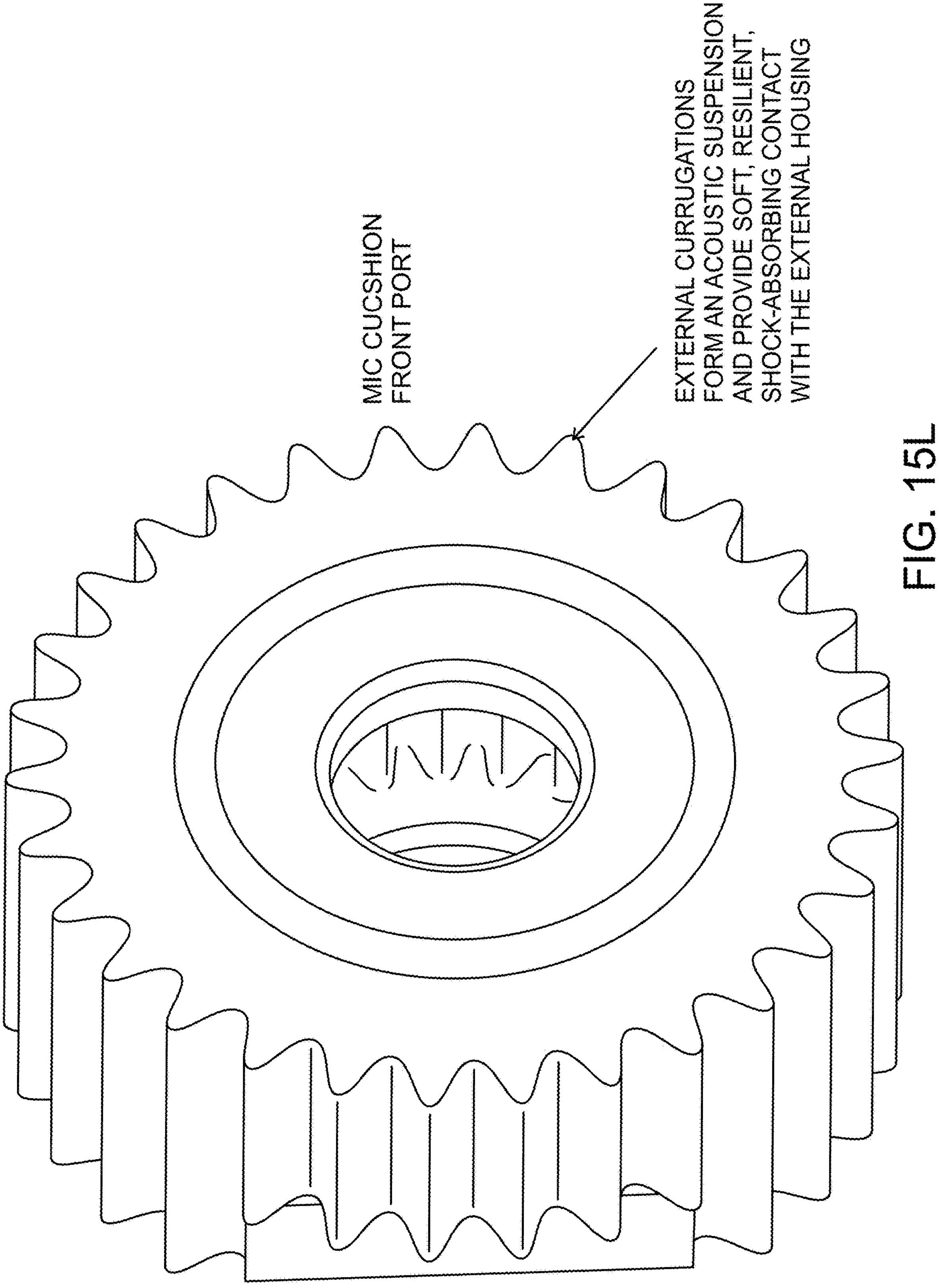
FIG. 15L depicts a view of the microphone cushion at the front port where external corrugations are provided which form an acoustic suspension and provide a soft, resilient, shock-absorbing contact with the external housing.
Figure 15M:
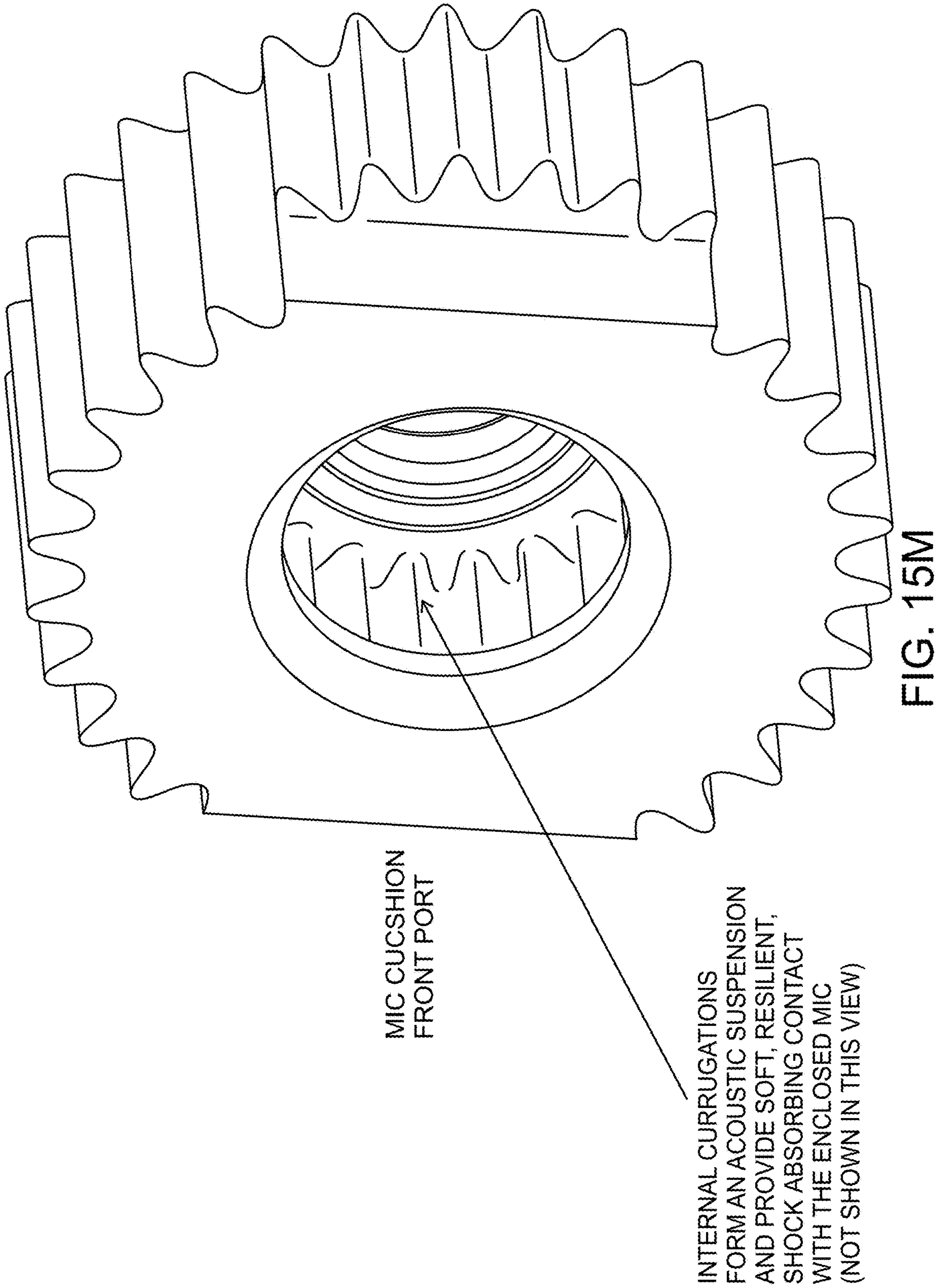
FIG. 15M depicts a view of the microphone cushion at the rear port where internal corrugations form an acoustic suspension and provide soft, resilient, shock-absorbing contact with the enclosed microphone (that is not shown in this view).

FIG. 15A depicts the microphone transmitter with a neck-worn lanyard where the lanyard is secured to the housing with magnets for safe release. FIG. 15B depicts the microphone transmitter (in the embodiment depicted in FIG. 15A) showing the magnet at each end of the lanyard while the tubing is hidden. FIG. 15C depicts another view of the microphone transmitter that further depicts: (1) the front surface of the microphone housing for a unidirectional (cardioid) microphone oriented toward the user, (2) a magnetic cavity for rapid engagement of lanyard, (3) a power on/off button and light pipe, (4) a microphone mute button and light pipe, (5) a 3.5 mm jack for audio input from an external source, (6) a micro USB receptacle for programming or charging, and (7) a rear microphone port that is vented to ambient air by a series of "V" slots, where such rear venting allows noise cancellation via the cardioid polar pattern at 180 degrees from the front microphone surface. FIG. 15D depicts the microphone transmitter with a soft, sound-deadening anti-skid pad to dampen vibrations when operating in a horizontal position/"conference microphone mode". FIG. 15E depicts the microphone transmitter showing the charging contacts that connect with spring pins in the charging cup of the charger. FIG. 15F depicts the microphone transmitter with the top housing cover removed to reveal three magnets for pulling and holding the microphone transmitter into the charging cup. FIG. 15F also depicts the charging contacts that connect with spring pins in the charging cup. FIG. 15G depicts a cross-section of a portion of the microphone transmitter that shows the air venting slots for the microphone rear port, the airtight seal between the microphone rear port and microphone cushion, the airtight seal between the cushion and the microphone front port, and the airtight seal between the housing and the cushion front side. FIG. 15I depicts the microphone front port covered by an acoustically transparent fabric. FIG. 15J depicts the microphone rear port with perforations (13 small holes in circular pattern) where the openings together with the internal structure and materials provide a unidirectional (cardioid) polar pattern where the front port is at maximum sensitivity and the rear port is at a polar null, with approximately 20 db less sensitivity that front port. FIG. 15K depicts the cardioid pattern of the microphone polar plot showing the front port with maximum microphone output at 0 degrees and the rear port having a null output at 180 degrees. FIG. 15L depicts a view of the microphone cushion at the front port where external corrugations are provided which form an acoustic suspension and provide a soft, resilient, shock-absorbing contact with the external housing. FIG. 15M depicts a view of the microphone cushion at the rear port where internal corrugations form an acoustic suspension and provide soft, resilient, shock-absorbing contact with the enclosed microphone (that is not shown in this view).

Figure 17:
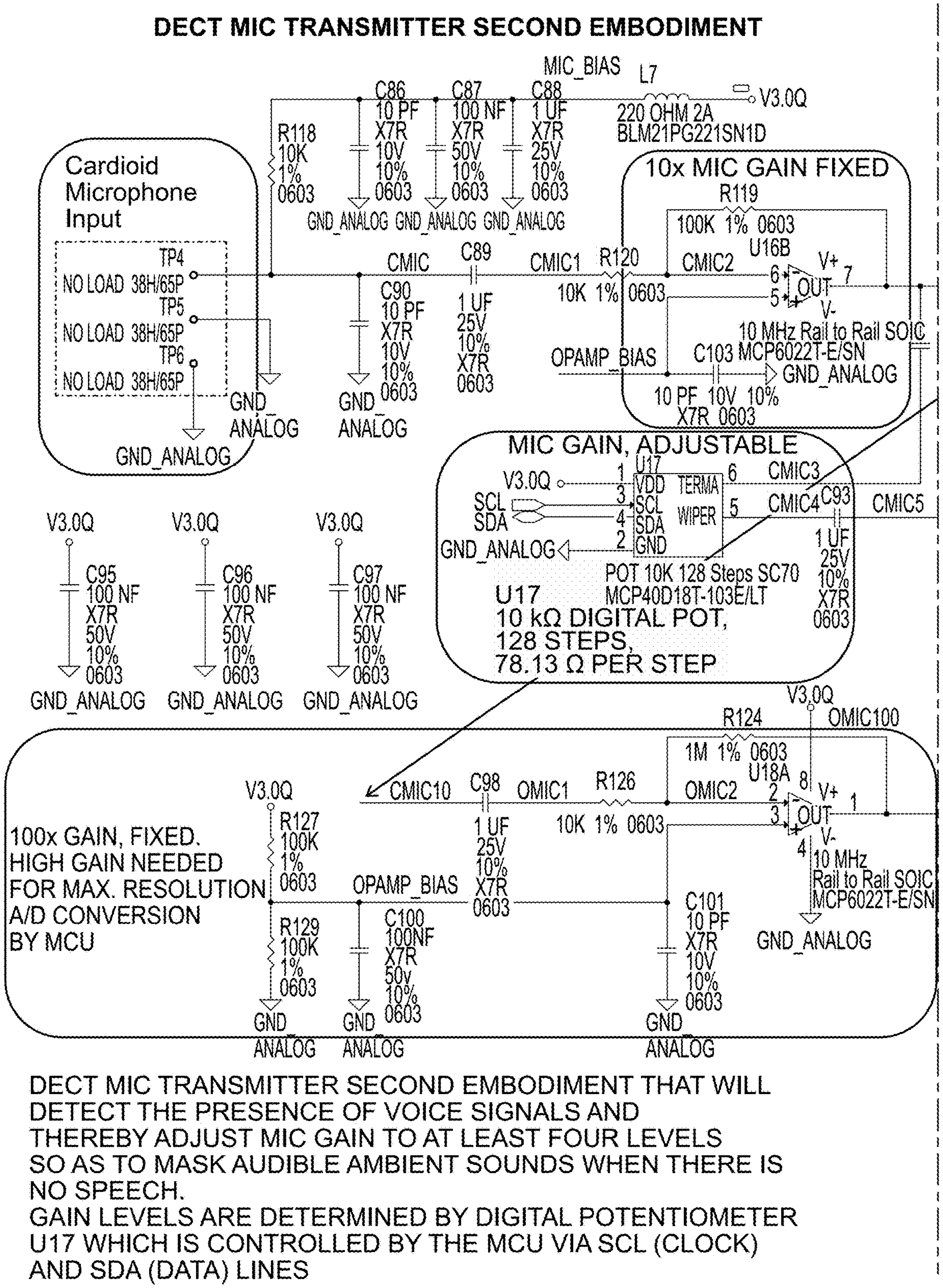
FIG. 17 depicts another embodiment of the microphone transmitter with digital multi-step adjustment of microphone level.
Figure 17:
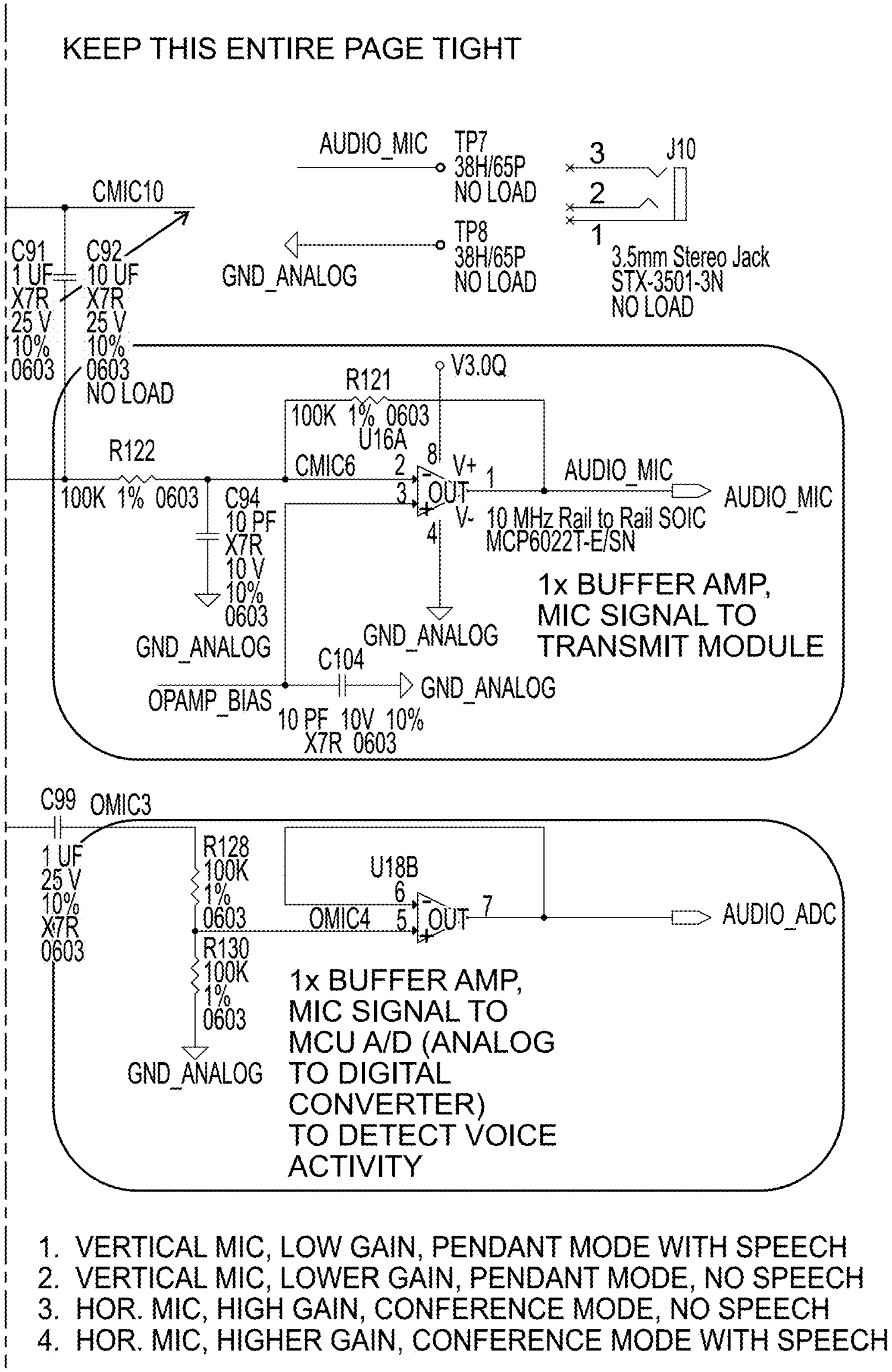

FIG. 17 depicts another embodiment of the microphone transmitter comprising: (a) a portable housing; (b) a microcontroller; (c) a microphone receiving sound arriving via a first port and a second port located in the portable housing and generating a microphone input signal, the microcontroller providing a noise-control signal based on whether noise or speech is arriving at the microphone ports, and generating a noise-attenuated signal output in the absence of speech, where said noise-attenuated signal is varied by said noise-control signal in fine steps as and when needed by a digital potentiometer; (d) an accelerometer circuit configured to generate an orientation signal based on a sensed orientation of the portable housing; (e) a voice activity detector circuit detecting when the microphone output contains voice activity and when the microphone output contains no voice activity; (f) a transmitter circuit operable for transmitting output of the microphone level adjustment circuit; (g) a power source configured to power the microcontroller, the microphone, the accelerometer circuit, and the transmitter circuit; wherein the power source, the microcontroller, the microphone, the high-voltage bias circuit, the accelerometer circuit, the voice activity detector circuit, the microphone level adjustment circuit, and the transmitter circuit are located within the portable housing; and the microcontroller receiving the orientation signal and operating the microphone in one of the following modes: (1) operate the microphone at a first low microphone gain, G1, when the portable housing is in a vertical position and when voice activity is detected by the voice activity detector circuit; (2) operate the microphone at a second lower microphone gain, G2, when the portable housing is in a vertical position and when no voice activity is detected by the voice activity detector circuit, where G2<G1; (3) operate the microphone at a first high microphone gain, G3, when the portable housing is in a horizontal position and when no voice activity is detected by the voice activity detector circuit; or (4) operate the microphone at a second higher microphone gain, G4, when the portable housing is in a horizontal position and when voice activity is detected by the voice activity detector circuit, where G3<G4.

Figure 18:
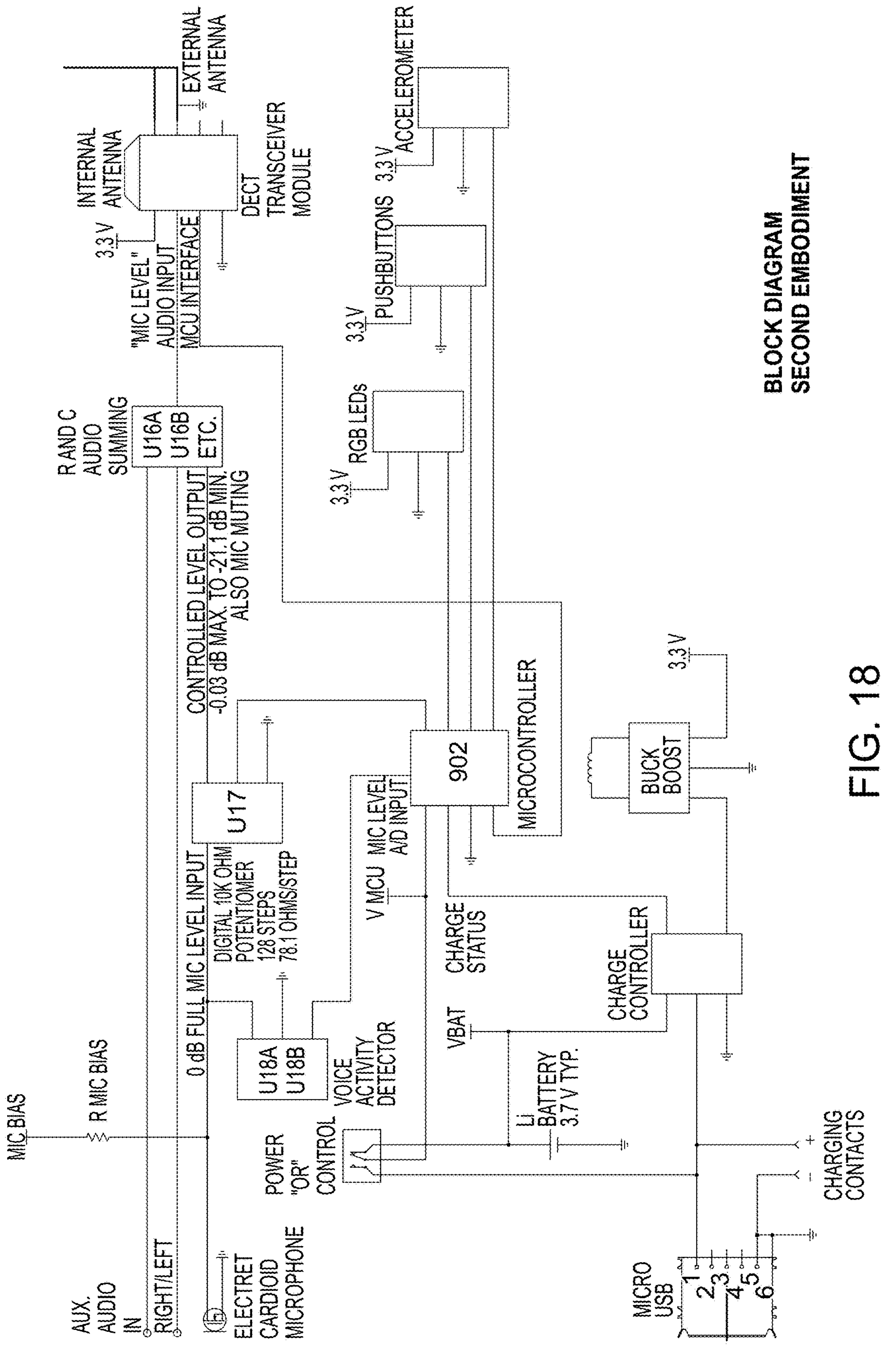
FIG. 18 depicts an overall architecture according to the second embodiment of the present invention.

FIG. 18 depicts an overall architecture according to the second embodiment of the present invention. FIG. 18 depicts all relevant circuit blocks of the second embodiment, as disclosed above with reference to FIG. 17. Furthermore, FIG. 18 also depicts the interconnection among the circuit blocks. Op amps U16A, U16B (FIG. 17) with several adjacent R and C components, for instance, R56, C49, R85 (FIG. 17), operate to sum audio signals from the microphone and the auxiliary audio port and scale them to a "MIC LEVEL" of about 10 mV RMS, suitable for the DECT module. Op amps U18A and U18B operate as a voice activity detector so that digital potentiometer U17 may adjust the gain of the microphone signal as disclosed previously with reference to FIG. 17. U17 is digitally adjustable in 127 steps of 78.1Ω per step, said otherwise from a minimum value of 78.1Ω to a maximum value of 10 kΩ. All other blocks shown in FIG. 18 operate as described previously with reference to FIG. 16.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device.

In this specification, the term “software” is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method have been shown in the above embodiments for the effective implementation of a wearable microphone transmitter. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, specific computing hardware or radio frequency hardware.

The invention claimed is:

1. A microphone transmitter comprising:

a portable housing;

a microcontroller;

a microphone receiving sound arriving via a first port and a second port located in the portable housing and generating a microphone input signal, the microcontroller providing a noise-control signal based on whether noise or voice is arriving at the microphone ports, and generating a noise-attenuated signal output in the absence of voice;

a transmitter circuit operable for transmitting the noise-attenuated signal;

an accelerometer circuit configured to generate an orientation signal based on a sensed orientation of the portable housing, a power source configured to power the microcontroller, the microphone, the transmitter circuit, and the accelerometer circuit, wherein the power source, the microcontroller, the microphone, the transmitter circuit, the accelerometer circuit are located within the portable housing, and wherein the microcontroller receives the orientation signal and operates in a high gain mode when the portable housing is in a horizontal position or in a low gain mode when the portable housing is in a vertical position.

2. The microphone transmitter of claim 1 further comprising a removable magnetically secured lanyard allowing the wearable microphone transmitter to be used as a hands-free device.

3. The microphone transmitter of claim 1, wherein the power source comprising a rechargeable power source.

4. The microphone transmitter of claim 1 further comprising a resilient non-skid pad on a bottom side of the portable housing to dampen vibrations when the portable housing is in the horizontal position.

5. The microphone transmitter of claim 1 further comprising a cushion assembly for positioning the microphone within the portable housing with minimal contact to surrounding surfaces in the portable housing.

6. The microphone transmitter of claim 1, wherein the transmitter circuit comprises a DECT transmitter module.

7. The microphone transmitter of claim 1, wherein the microphone is a unidirectional microphone.

8. The microphone transmitter of claim 7, wherein the unidirectional microphone is a unidirectional electret microphone.

9. The microphone transmitter of claim 1, wherein the second port is located in an opposite direction within the portable housing from the first port.

10. The microphone transmitter of claim 1, wherein the accelerometer and the microcontroller provide a microphone muting signal when the accelerometer detects shock or free fall.

11. A microphone transmitter comprising:

a portable housing;

a microcontroller;

a microphone receiving sound arriving via a first port and a second port located in the portable housing and generating a microphone input signal, the microcontroller providing a noise-control signal based on whether noise or voice is arriving at the microphone ports, and generating a noise-attenuated signal output in the absence of voice;

a high-voltage bias circuit comprising a voltage step-up circuit configured to generate a high microphone output level signal from the noise-attenuated signal;

an accelerometer circuit configured to generate an orientation signal based on a sensed orientation of the portable housing;

a microphone level adjustment circuit receiving the high microphone output level signal, the microphone level adjustment circuit comprising one or more field-effect transistors (FETs), the microphone level adjustment circuit, upon receiving instructions from the microcontroller, configured to operate either in a high gain mode when the portable housing is in a horizontal position or in a low gain mode when the portable housing is in a vertical position, wherein the FETs are turned off to increase a microphone level when the portable housing is in the horizontal position and the FETs are turned on to decrease the microphone level when the portable housing is in the vertical position;

a transmitter circuit operable for transmitting output of the microphone level adjustment circuit;

a power source configured to power the microcontroller, the microphone, the high-voltage bias circuit, the accelerometer circuit, the microphone level adjustment circuit, and the transmitter circuit;

wherein the power source, the microcontroller, the microphone, the high-voltage bias circuit, the accelerometer circuit, the microphone level adjustment circuit, and the transmitter circuit are located within the portable housing.

12. The microphone transmitter of claim 11, wherein the voltage step-up circuit is a boost converter.

13. The microphone transmitter of claim 12, wherein the boost converter is a buck-boost converter.

14. The microphone transmitter of claim 11, wherein the one or more FETs are junction FETs (JFETs).

15. The microphone transmitter of claim 11, wherein the microphone level adjustment circuit further comprises a first resistor, R1, and a second resistor, R2, where R2/R1>1000, and when the FETs are turned off, the microphone level is increased by shunting R1 to ground by higher resistance R2, and when the FETs are turned on, the microphone level is decreased as R2 is shorted to ground by the FETs.

16. The microphone transmitter of claim 11, wherein the microphone transmitter is a wearable microphone transmitter.

17. The microphone transmitter of claim 16, further comprising a removable magnetically secured lanyard allowing the wearable microphone transmitter to be used as a hands-free device.

18. The microphone transmitter of claim 11, wherein the power source comprising a rechargeable power source.

19. The microphone transmitter of claim 11, further comprising a resilient non-skid pad on a bottom side of the portable housing to dampen vibrations when the portable housing is in the horizontal position.

20. The microphone transmitter of claim 11, further comprising a cushion assembly for positioning the microphone within the portable housing with minimal contact to surrounding surfaces in the portable housing.

21. The microphone transmitter of claim 11, wherein the transmitter circuit comprises a DECT transmitter module.

22. The microphone transmitter of claim 11, wherein the microphone is a unidirectional microphone.

23. The microphone transmitter of claim 22, wherein the unidirectional microphone is a unidirectional electret microphone.

24. The microphone transmitter of claim 11, wherein the second port is located in an opposite direction within the portable housing from the first port.

25. The microphone transmitter of claim 11, wherein the accelerometer and the microcontroller provide a microphone muting signal when the accelerometer detects shock or free fall.

26. A microphone transmitter comprising:

a portable housing;

a microcontroller;

a microphone receiving sound arriving via a first port and a second port located in the portable housing and generating a microphone input signal, the microcontroller providing an incrementally adjustable noise-control signal based on whether noise or voice is arriving at the microphone ports, and generating a noise-attenuated signal output in the absence of voice;

an accelerometer circuit configured to generate an orientation signal based on a sensed orientation of the portable housing;

a voice activity detector circuit detecting when the microphone output contains voice activity and when the microphone output contains no voice activity;

a transmitter circuit operable for transmitting output of the microphone level adjustment circuit;

a power source configured to power the microcontroller, the microphone, the accelerometer circuit, and the transmitter circuit;

wherein the power source, the microcontroller, the microphone, the high-voltage bias circuit, the accelerometer circuit, the voice activity detector circuit, the microphone level adjustment circuit, and the transmitter circuit are located within the portable housing; and the microcontroller receiving the orientation signal and operating the microphone in one of the following modes:

operate the microphone at a first low microphone gain, G1, when the portable housing is in a vertical position and when voice activity is detected by the voice activity detector circuit;

operate the microphone at a second lower microphone gain, G2, when the portable housing is in a vertical position and when no voice activity is detected by the voice activity detector circuit, where G2<G1;

operate the microphone at a first high microphone gain, G3, when the portable housing is in a horizontal position and when no voice activity is detected by the voice activity detector circuit; or operate the microphone at a second higher microphone gain, G4, when the portable housing is in a horizontal position and when voice activity is detected by the voice activity detector circuit, where G3<G4.

27. The microphone transmitter of claim 26, wherein the microphone transmitter is a wearable microphone transmitter.

28. The microphone transmitter of claim 27, further comprising a removable magnetically secured lanyard allowing the wearable microphone transmitter to be used as a hands-free device.

29. The microphone transmitter of claim 26, wherein the power source comprising a rechargeable power source.

30. The microphone transmitter of claim 26, further comprising a resilient non-skid pad on a bottom side of the portable housing to dampen vibrations when the portable housing is in the horizontal position.

31. The microphone transmitter of claim 26, further comprising a cushion assembly for positioning the microphone within the portable housing with minimal contact to surrounding surfaces in the portable housing.

32. The microphone transmitter of claim 26, wherein the transmitter circuit comprises a DECT transmitter module.

33. The microphone transmitter of claim 26, wherein the microphone is a omnidirectional microphone.

34. The microphone transmitter of claim 26, wherein the second port is located in an opposite direction within the portable housing from the first port.

35. The microphone transmitter of claim 26, wherein the accelerometer and the microcontroller provide a microphone muting signal when the accelerometer detects shock or free fall.

* * * * *